United States Patent [19]

Grover

[11] 4,265,131
[45] May 5, 1981

[54] MACHINE TOOL TRANSFER BAR ACTUATOR UNIT

[75] Inventor: Robert R. Grover, Westport, N.H.

[73] Assignee: Kingsbury Machine Tool Corporation, Keene, N.H.

[21] Appl. No.: 919,936

[22] Filed: Jun. 28, 1978

[51] Int. Cl.³ .................... F16H 27/02; F16H 37/12
[52] U.S. Cl. .................................. 74/89.16; 74/50; 74/52; 74/411
[58] Field of Search ............... 74/27, 52, 89, 89.1, 74/89.13, 89.16, 411, 50

[56] References Cited

U.S. PATENT DOCUMENTS

| | | | |
|---|---|---|---|
| 914,215 | 3/1909 | Adams | 74/50 X |
| 1,649,739 | 11/1927 | Rosselle | 74/411 X |
| 2,247,839 | 7/1941 | Halford et al. | 74/411 X |
| 2,590,492 | 3/1952 | Bennett et al. | 74/52 X |
| 2,800,029 | 7/1957 | Vail | 74/52 X |
| 2,802,377 | 8/1957 | Berthiez | 74/411 X |
| 3,401,568 | 9/1968 | Blatt | 74/52 X |
| 4,023,420 | 5/1977 | Dressler | 74/52 |
| 4,089,228 | 5/1978 | Obra | 74/52 |

FOREIGN PATENT DOCUMENTS

| | | | |
|---|---|---|---|
| 523737 | 4/1931 | Fed. Rep. of Germany | 74/50 |
| 584082 | 9/1933 | Fed. Rep. of Germany | 74/50 |
| 487469 | 4/1918 | France | 74/50 |
| 1152951 | 9/1957 | France | 74/411 |

OTHER PUBLICATIONS

Product Engineering, "Cardan-Gear", pp. 66-67, Sep. 28, 1959.

Primary Examiner—Lawrence J. Staab
Attorney, Agent, or Firm—Diller, Ramik & Wight

[57] ABSTRACT

A mechanism for translating rotation motion to linear motion utilizing a turret rotatable about a first axis carrying a crank shaft rotatable about a second axis parallel to but offset from the turret axis and carrying a crank arm which in turn carries a drive element having a third axis parallel to but offset from the first and second axes, the drive element contacting and driving a driven element guided for movement along a generally linear path upon the rotation of the turret between first and second generally diametrically opposite positions relative to the arc of rotation of the turret, a pair of cooperative abutment members for absorbing the momentum of a load driven by the driven element, one of the abutment members being carried by the turret and gearing meshingly interconnecting another of the abutment members and the crank shaft, the one abutment member being effective to contact and move the other abutment member upon the driving element moving contiguous the first and second positions, and a spring yieldable against the movement of the another abutment member thereby absorbing the momentum transferred thereto from the turret through the meshed gearing.

31 Claims, 25 Drawing Figures

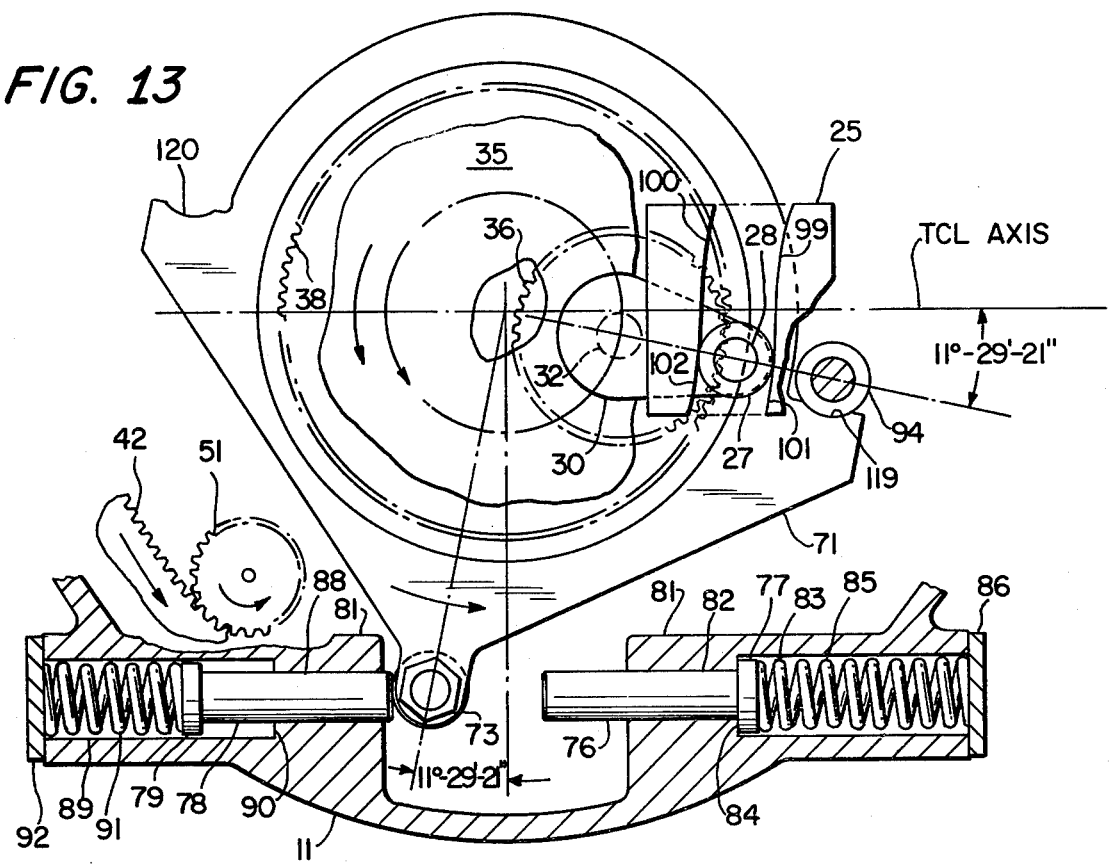
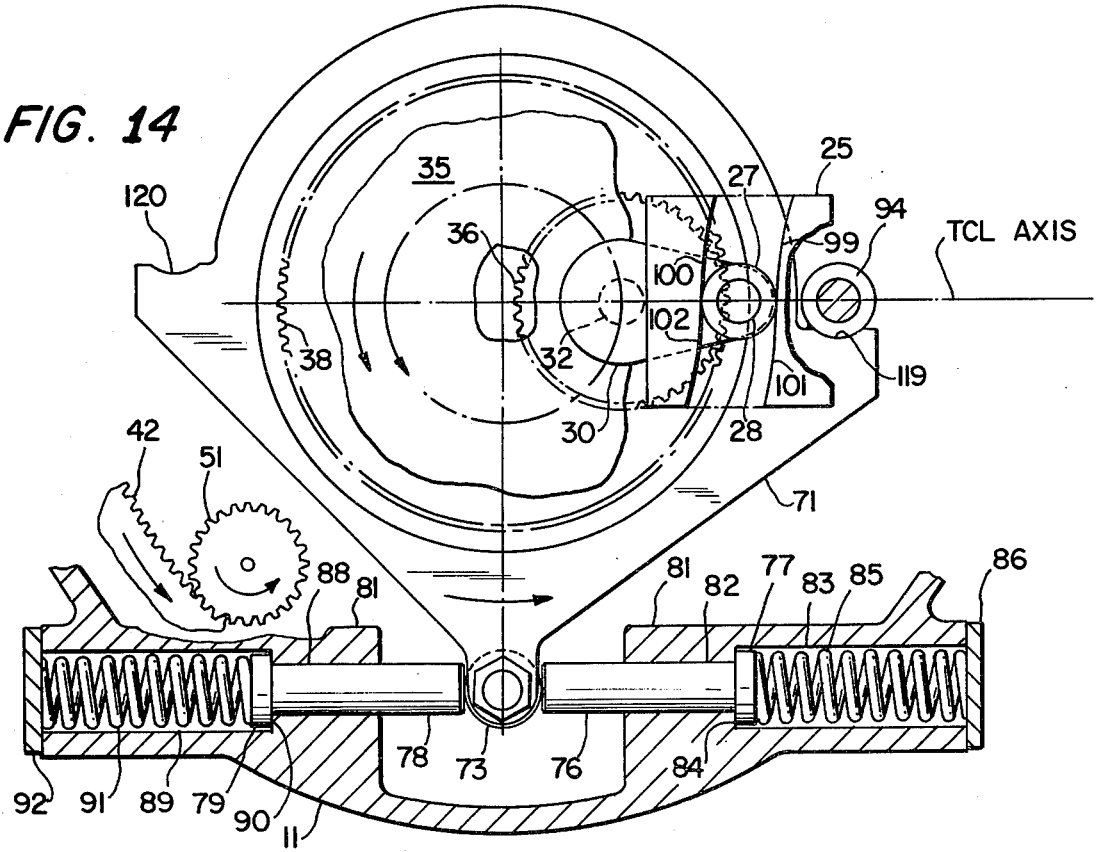

MACHINE TOOL TRANSFER BAR ACTUATOR UNIT

The present invention relates to improvements in a motorized or mechanical drive for the work piece carrying transfer bar and slideably mounted transfer bar carriage of a machine tool and, more particularly, although not limited in this respect, to the drive employed for the work piece carrying transfer bar in mass production transfer equipment now commonly in use.

This invention further relates to improvements in automatic transfer type machine tools, which include a transfer machine base upon which is attached a transfer unit body within which is mounted a stationary monorail slideably connected to a transfer bar carriage, that has mounted thereto a transfer bar in which the transfer bar is slideably moved in a harmonic manner throughout its forward and reverse stroke linear movement.

The usual prior art transfer machines comprise a plurality of equally spaced working stations, with a transfer bar arrangement for sequentially advancing a workpiece from station to station, in a manner that a plurality of different machining operations can be performed. Such transfer bar arrangement with a cooperating transfer mechanism is interconnected in the machine tool system as to alternately advance the workpiece to a working station and therewith a clamping mechanism forcefully engages and moves the workpiece from the transfer bar to a working station and securely clamping the workpiece to the working station. Such a clamping mechanism is shown with general parts in the Kingsbury U.S. Pat. No. 3,561,749. Such machines usually are set up in advance to perform a plurality of different machining operations upon extremely large lots of Workpieces. In spite of the fact that transfer machines are usually limited to extremely large lots of workpieces, the principal advantage is, of course, the fact that nonproductive or idle time at the working stations is reduced to an absolute minimum.

Another object of this invention is to provide an improved transfer bar mechanism wherein the transfer bar is slideably moved in a harmonic manner throughout its forward stroke linear movement, with positive stop means and dwell means at the termination of its forward stroke linear movement, to prevent damage to the transfer bar mechanism; and reversely wherein the transfer bar is slideably moved in a harmonic manner throughout its return stroke linear movement, with positive stop means and dwell means at the termination of its return stroke linear movement, to prevent damage to the transfer bar mechanism.

A still further object of this invention is to provide a greatly improved harmonic motion linear transfer mechanism, such that; normally in prior art in a linear motion transfer, as the harmonic motion is decelerating, the follower member overrides the deceleration, resulting in an objectionable shock load on the follower member. However in this invention to provide a greatly imporved harmonic linear motion transfer mechanism, such that; the instant during deceleration that the follower member overrides the deceleration occurs, a centrally preloaded centering arm acts as a cushioning device to absorb the shock load on the follower member to prevent damage.

A further object of this invention is to provide automatic positive stop and dwell operation for a transfer bar at the completion of its forward and reverse linear stroke in a machine tool having an electromagnet brake equipped reversable drive motor, which motor is operatively connected to a crank turret, a crank follower roll and a crank arm and shaft are rotably mounted within the said crank turret and for rotation therewith with its shaft end in geared engagement with a centering arm whose axially extended end has a follower roll in preloaded engagement with spring biased stop plungers diametrically opposite one another to bear on the follower roll so that a preliminary tension exists on the follower roll, and the centering arm is in a bilateral preloaded condition about its rotative axis; the aforesaid crank turret has mounted outwardly of its axis a turret follower roll confined to rotate freely a predetermined number of degrees through an arc and then engage the aforesaid centering arm in a clockwise or counterclockwise rotation; the aforesaid crank follower roll and crank arm operate such that the crank follower roll is confined in transversely intersecting dual radius dwell slot of a carrier plate attached to a transfer bar carrying carriage. Thus the crank turret, when rotated jointly in a forward or reverse direction by the drive motor, acts on the geared arrangement of the crank follower roll and crank arm and centering arm to permit the aforesaid crank follower roll to travel in a linear direction and forcefully move the said transfer bar carrying carriage in the same linear direction until the aforesaid turret follower roll completes its predetermined number of degrees arc to engage the aforesaid centering arm, and then; the said crank follower roll ceases its linear movement, and the said transfer bar carrying carriage has completed its linear stroke and ceases to linearly move, and then; with deenergization of the drive motor and application of the electromagnetic brake with accompanying brake disc slip throughout deceleration, the crank turret and the said crank follower roll and crank arm and said centering arm rotate radially as a unit about the crank turret axis forcefully moving the said follower roll on the extended end of the centering arm and forcefully moving the aforesaid spring biased stop plunger. Thus with movement of the spring biased stop plunger and accompanying radial rotation of the crank turret and the crank follower roll in the said transversely intersecting dual radius dwell slot of the carrier plate the attached transfer bar carrying carriage is restrained from further linear movement and is in its dwell operation throughout the aforesaid brake disc slip deceleration interval of the said drive motor.

However, as aforesaid described with deenergization of the drive motor and application of the electromagnetic brake with accompanying brake disc slip during deceleration, the crank turret and the crank follower roll, and the crank arm and said centering arm rotate radially as a unit about the crank turret axis forcefully moving the follower roll on the extended end of the centering arm and forcefully moving the said spring biased stop plunger such that the centering arm is in a preloaded condition about its shaft axis, such that; the said centering arm acts as a cushioning device to absorb the force load on the follower roll member and assist and minimize the aforesaid brake slip deceleration interval of the said drive motor to prevent damage.

With the above and other objects in view that will hereinafter appear, the nature of the invention will be more clearly understood by reference to the following description, the appended claims and the several views illustrated in the accompanying drawings;

IN THE DRAWINGS

FIGS. 13 to 17 are successive diagrammatic views showing the mechanical parts during the course of a return traversing operation and dwell interval.

Figure 1:
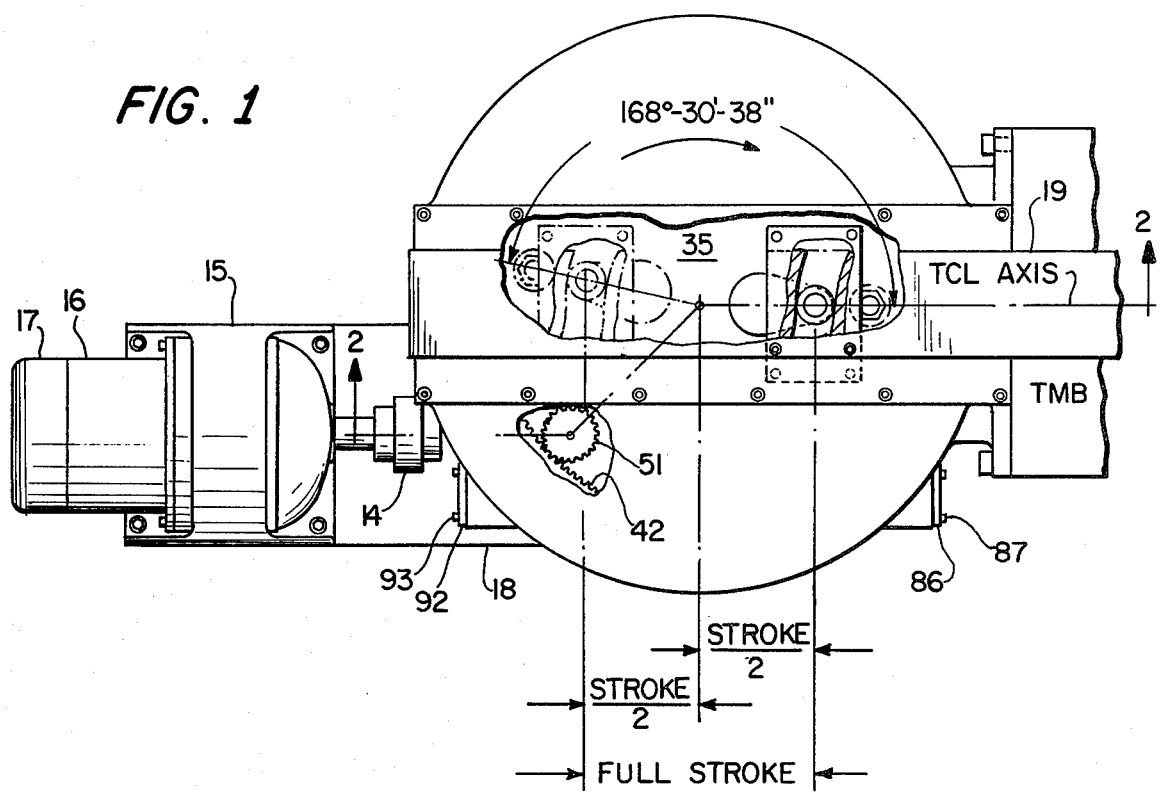
FIG. 1 is a plan view on a small scale, of a machine embodying the present invention, with part of the top portion broken away to show internal components, and in which the crank turret is shown rotated 168°-30'-38" clockwise to move the transfer bar throughout its full forward stroke.
Figure 2:
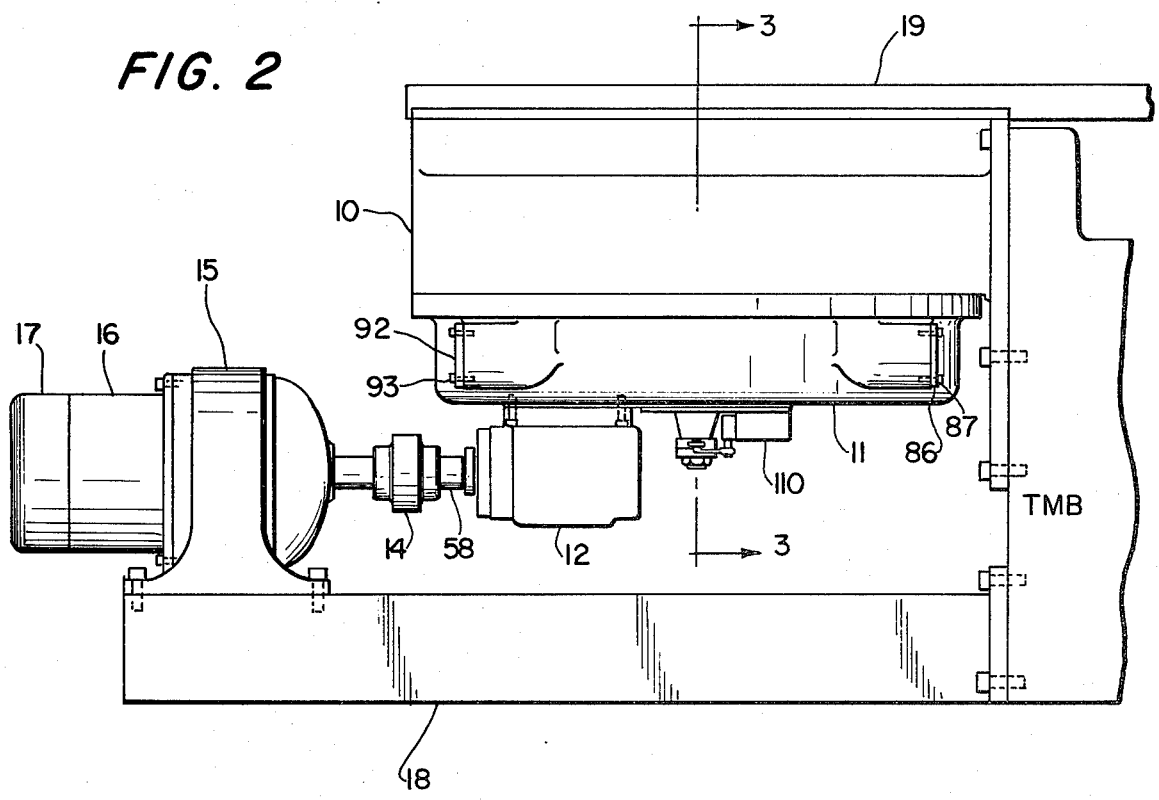
FIG. 2 is a side elevation of the machine in FIG. 1.

Referring now to the drawings in detail, reference is first made to FIG. 1 and FIG. 2, wherein there is illustrated a transfer machine base TMB, (shown but not being a part of this invention), upon which is attached an actuator body portion 10, a turret body portion 11, and a gear housing portion 12, with an extending drive shaft 58 and universal joint 14 in couple with a gear reducer 15 with an attached reversable motor 16 and motor brake 17. The gear reducer 15 is mounted upon a mounting platform 18 attached to the transfer machine base TMB.

Figure 3:
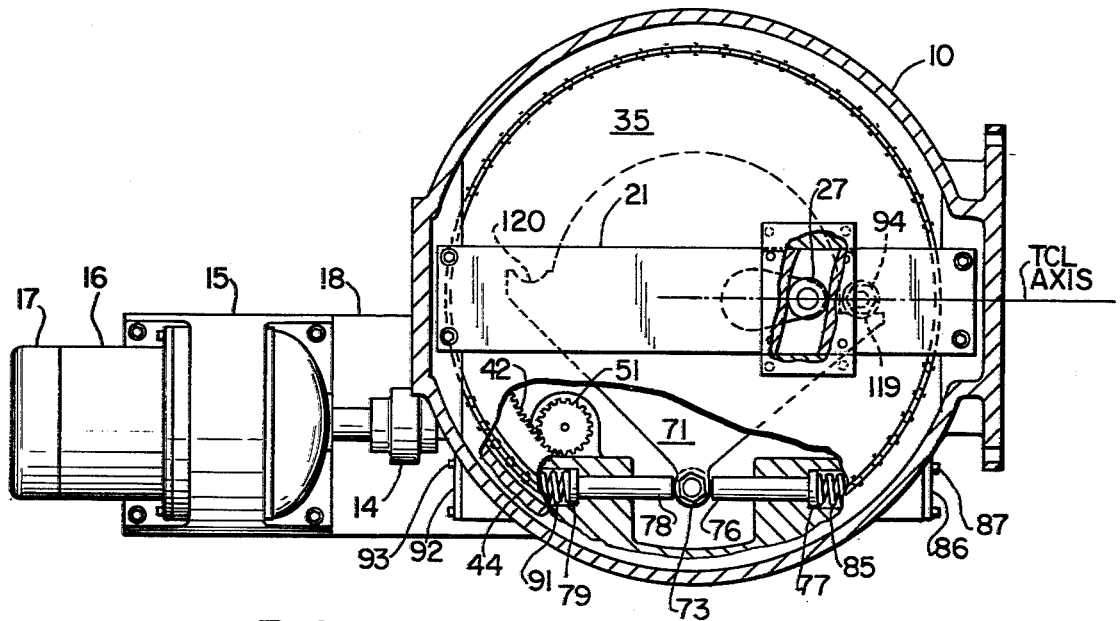
FIG. 3 is a horizontal sectional view of the traverse bar mechanism of this invention, taken along line 4—4 of FIG. 5, and wherein the transfer bar carrier plate and transfer bar carriage is shown in its extreme full forward stroke position.
Figure 4:
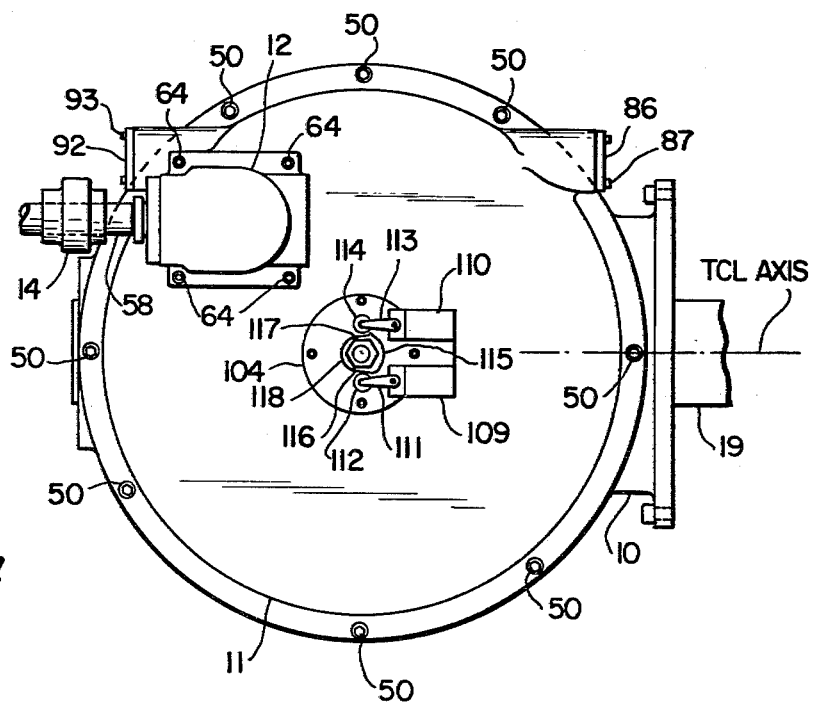
FIG. 4 is a bottom view of the machine in FIG. 1, wherein cams rotably mounted with the crank turret and limit switches mounted to the turret base which comprise the actuating means are best illustrated.
Figure 5:
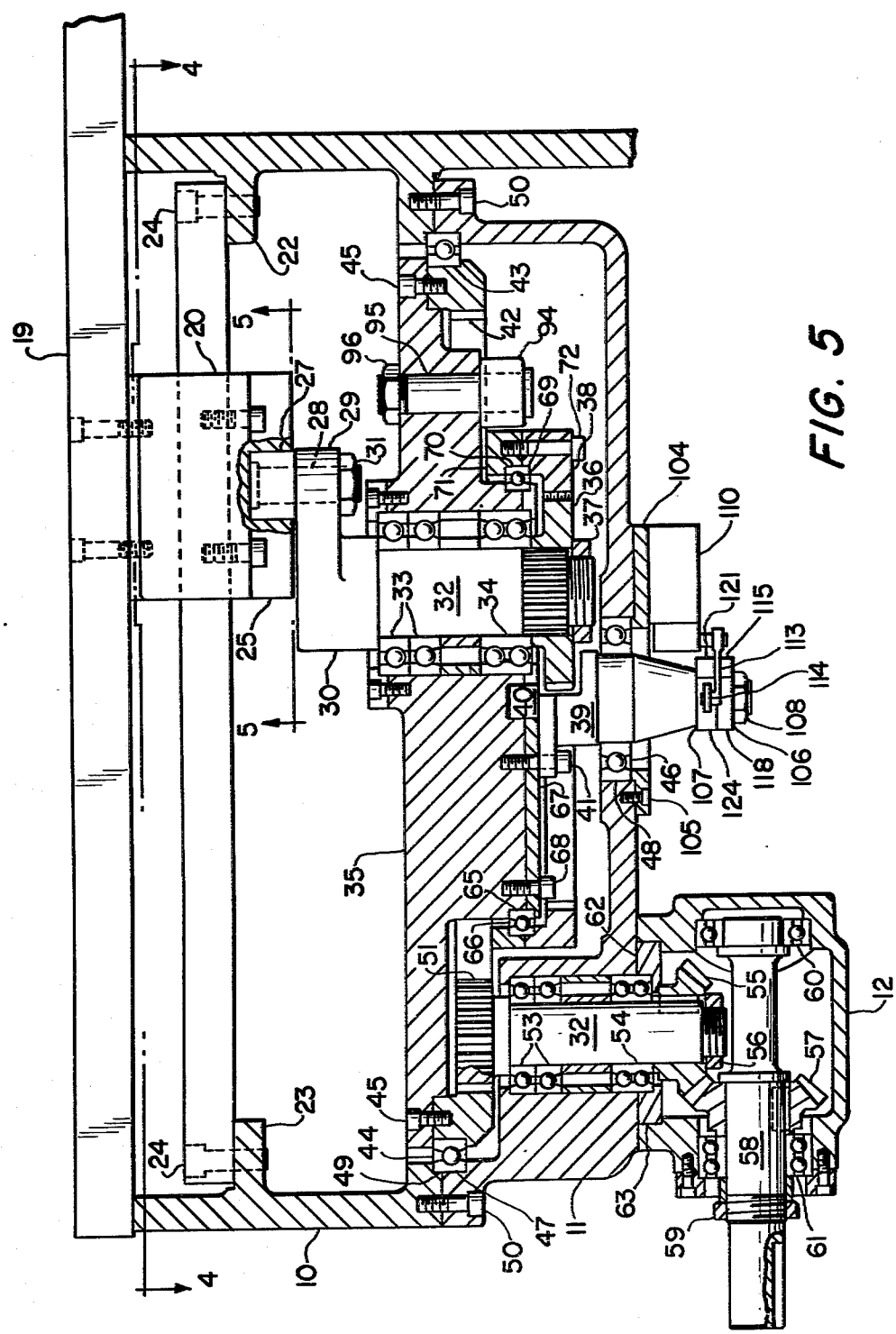
FIG. 5 is a vertical sectional view on an enlarged scale and substantially on line 2—2 of FIG. 1, indicating the relative positions and cooperation of the transfer mechanism, the turret drive gearing, the transfer bar, the transfer bar carriage, the stationary monorail, the transfer bar carrier plate, and the transfer bar drive unit structure.
Figure 6:
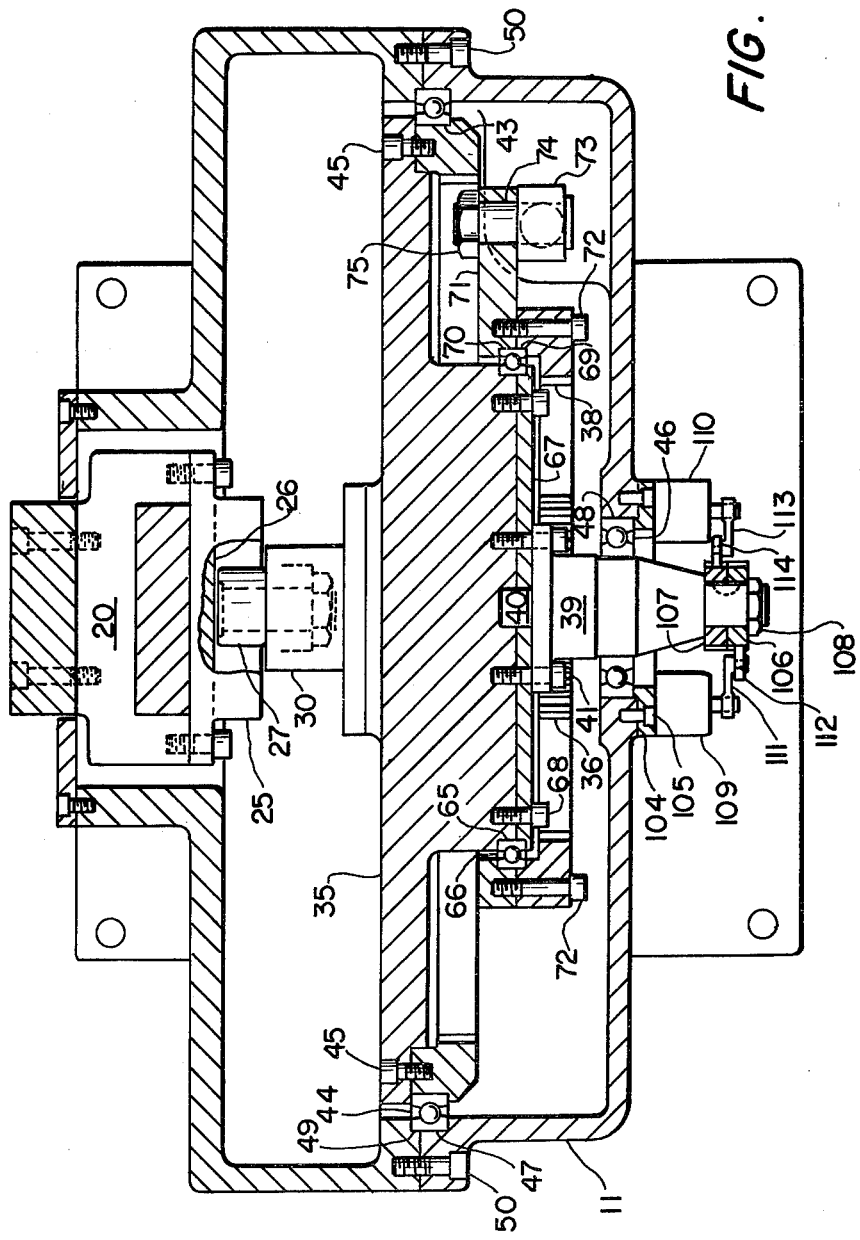
FIG. 6 is a vertical sectional view on an enlarged scale and substantially on line 3—3 of FIG. 2, indicating the relative positions and cooperation of the transfer mechanism, the centering arm in its spring biased condition, the crank turret, and the transfer bar drive unit structure.

With particular reference to FIGS. 5 and 6 a transfer bar 19 is attached to a transfer bar carriage 20 and slideably connected to a stationary monorail 21 supported at each end by ledge portions 22 and 23 within the actuator body 10 and fixed therein by screws 24. The transfer bar carriage 20 has an attached carrier plate 25 with a transversely intersecting dual radius dwell slot 26. The transversely intersecting dual radius dwell slot is to be occupied by a follower roll 27 adapted to move the transfer bar 19 and the transfer bar carriage 20 in a rectilinear motion along the stationary monorail 21 and along the transfer center line axis TCL as viewed in (FIG. 1, FIG. 3, and FIG. 4). The follower roll 27 is provided, moving its crank pin 28 secured within the crank end portion 29 of crank arm 30, and held thereto by nut 31. The crank arm 30 is provided with a crank pinion stud 32 which is journalled in bearings 33 and 34, which are in turn housed within the crank turret 35, but outwardly displaced from the crank turret 35 rotational axis as best shown in FIG. 5. The crank arm 30 and crank pinion stud 32 of crank arm 30 has a crank pinion gear 36 splined thereto and held thereon by a nut 37 for rotation therewith and in position to engage an internal gear 38. The crank turret 35 has coaxially in alignment a shaft extension 39 with a shaft end 40 secured within the crank turret 35 and held thereto by screws 41 for rotation therewith. The crank turret 35 also has coaxially in alignment an internal gear 42 with a bearing surface 43 for journalling ball bearing 44 to the crank turret 35. The internal gear 42 is secured to the crank turret 35 by screws 45 for rotation therewith.

The crank turret 35 and shaft extension 39 is journalled in ball bearing 44 and 46 which are in turn housed within the wall portions 47 and 48 of turret body 11 to allow limited rotation of the crank turret 35 and shaft extension 39 therein. As shown in FIGS. 4 and 5 the actuator body 10 has a lower wall portion 49 to house a portion of ball bearing 44 securely thereto and thereby coaxially align the turret body 11 and actuator body 10 and provide axial cooperating alignment with the transfer center line axis TLC as viewed in FIG. 1, FIG. 3, and FIG. 4. The turret body is secured to the actuator body 10 by screws 50.

The internal gear 42 is in mesh with a pinion gear 51 with its shaft end 52 journalled in bearings 53 and 54 which are in turn housed within the turret body 11. The shaft end 52 has a bevel gear 55 keyed thereto and held thereon by a nut 56 and for rotation therewith and in position to mesh with bevel gear 57. The bevel gear 57 is in keyed engagement with a drive shaft 58 and held thereto by nut 59 for rotation therewith. The drive shaft 58 is journalled in bearings 60 and 61 which are in turn housed within the gear housing 12 and for rotation therein.

As shown in FIG. 5 to coaxially align the bevel gear 55 and shaft end 52, and the bevel gear 57 and drive shaft 58, within the gear housing 12, there is provided a centering ring 62 with a concentric inside diameter and outside diameter, such that; its inside diameter securely houses an extended portion of bearing 54 and its outside diameter is securely housed in a bored hole portion 63 of gear housing 12. The gear housing 12 is secured to the turret body 11 by screws 64 as shown in FIG. 4.

The drive shaft 58 has a universal joint 14 keyed or otherwise held thereto in couple with and in position to engage the gear reducer 15 with its attached reversible motor 16 and motor brake 17.

From the above description it will be readily apparent that with reversal of the reversible motor 16 and accompanying reversal of the gear reducer 15 means; to reverse the rotation of pinion gear 51 in mesh with internal gear 42 secured to the crank turret 35, is accomplished in order to allow limited rotation of the crank turret 35 in a clockwise or counterclockwise rotation.

Referring now to FIGS. 5 and 6 the crank turret 35 has coaxially in alignment a bearing surface 65 for journalling ball bearing 66 to the crank turret 35 and being secured thereto by bearing plate 67 and screws 68. Ball bearing 66 is housed partially in a wall portion 69 of internal gear 38 and is housed partially in a wall portion 70 of centering arm 71 in such a manner that with the internal gear 38 secured to centering arm 71 by screws 72 the outer raceway of ball bearing 66 is enclosed and the internal gear 38 and centering arm 71 are rotably mounted about the crank turret 35.

Referring now to FIGS. 3 and 6 the centering arm 71 has axially displaced a follower roll 73 is provided, having its stud 74 secured within the centering arm 71 and held thereto by nut 75.

Figure 9:
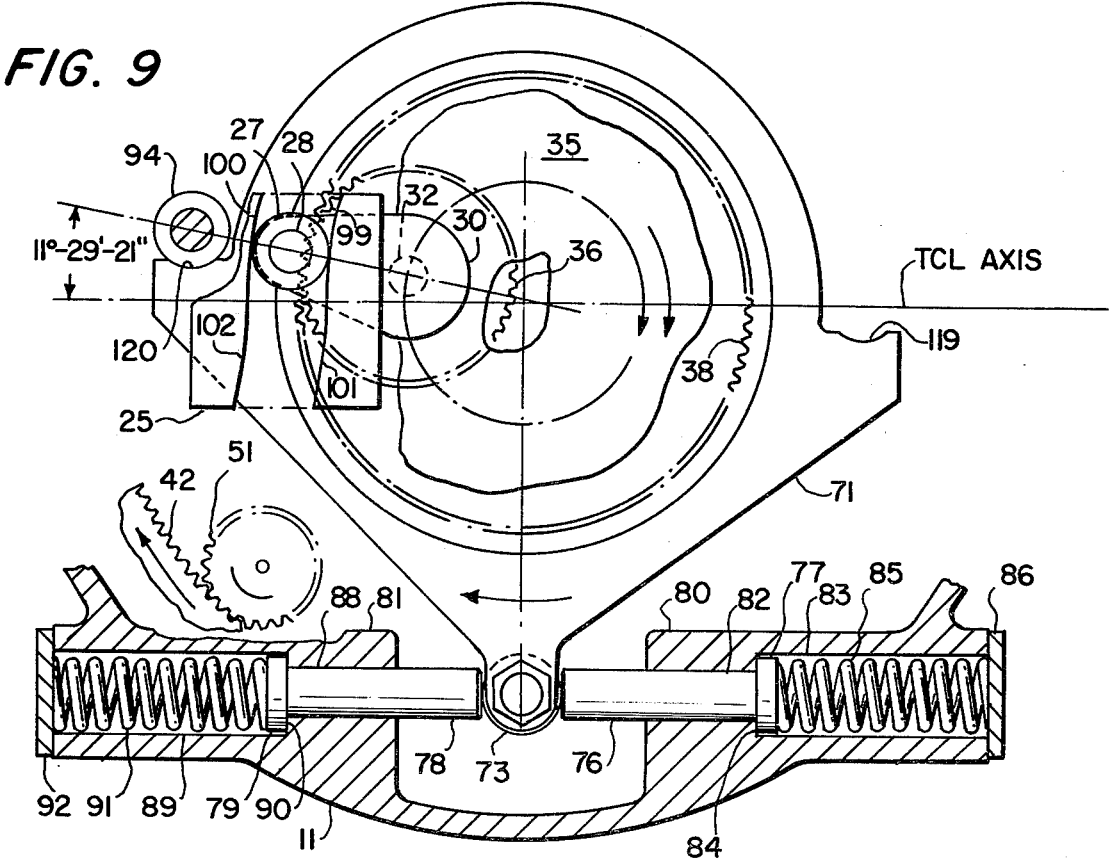

Referring now to FIGS. 3, 6 and 9 it is seen that stop plunger 78 with head portion 79 are provided extending through associated respective opposite wall portions 80 and 81 having side walls and bottom wall cooperating to define a generally u-shaped void in section across the side of turret body 11. The stop plunger 76 is provided slideable within a bore 82 and head portion 77 is provided slideable within a bore 83 with an abutment portion 84. A compression spring 85, with a preset or compressed stress in the spring 85 is disposed in bore 83 and held therein by cap 86 and screws 87, urging the head portion 77 of stop plunger 76 against the abutment portion 84 of bore 83. The stop plunger 78 is provided slideable within a bore 88 and head portion 79 is provided slideable within a bore 89 with an abutment portion 90. A compression spring 91, with a preset or compressed stress in the spring 91 is disposed in bore 89 and held therein by cap 92 and screws 93, urging the head portion 79 of stop plunger 78 against the abutment portion 90. From the foregoing it can be seen that the stop plunger 76 and stop plunger 78 are in engagement to bear on opposite sides of follower roll 73 and thereby retain the associated centering arm 71 in a central position, and the follower roll 73 and centering arm 71 are in a bilateral preloaded condition about their rotative axis.

Referring now to FIGS. 3, and 5 it is seen in FIG. 5 that the crank turret 35 has outwardly displaced from the crank turret 35 rotational axis a follower roll 94 is provided, having a stud 95 secured within the crank turret 35 and held thereto by nut 96 for rotation therewith and in position to rotate freely clockwise or counterclockwise throughout a predetermined limited number of degrees and then engage alternately in arcuate slots 119 and 120 of centering arm 71; the reason to be apparent as later described.

Figure 7:
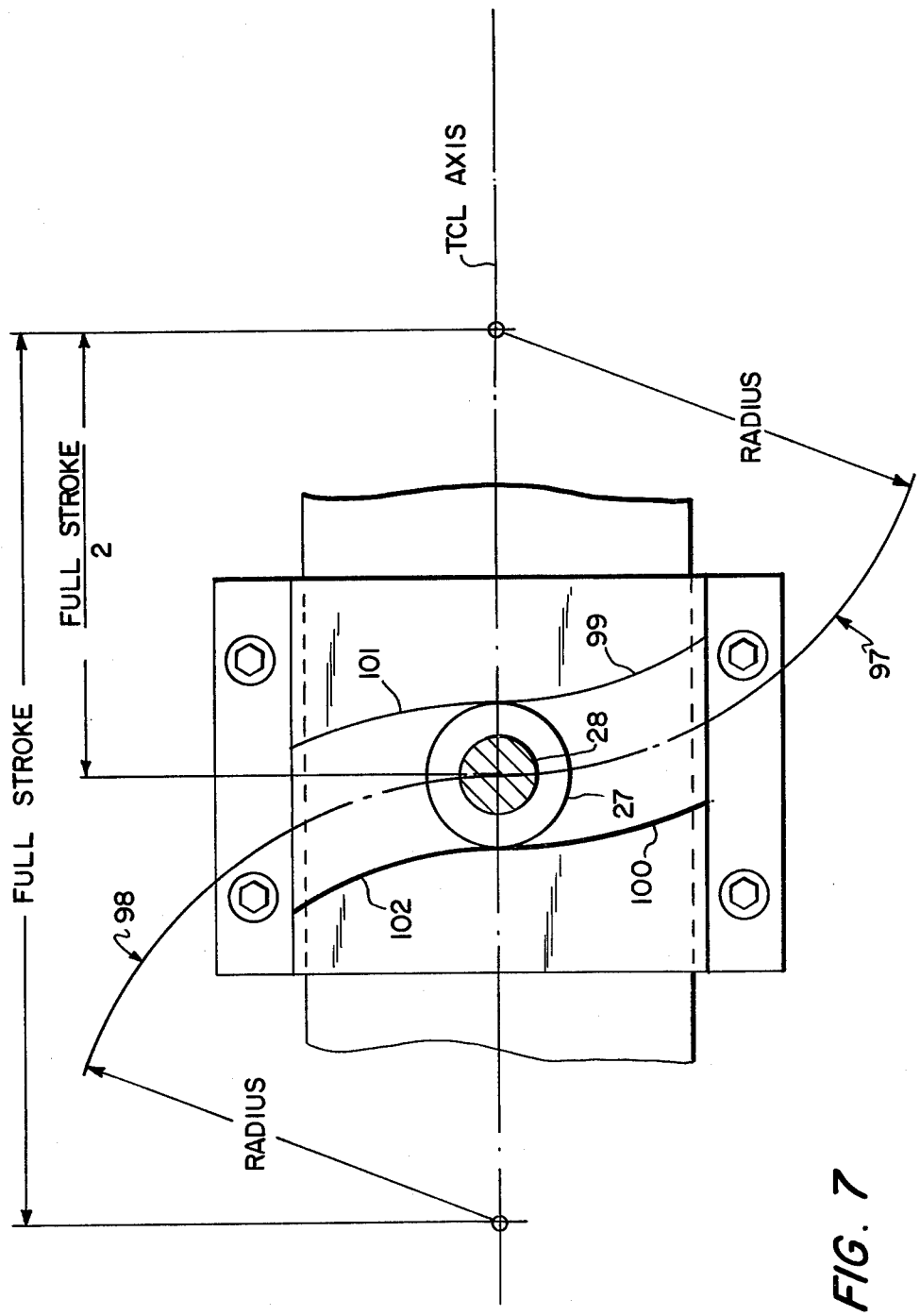
FIG. 7 is a bottom view of the carrier plate, taken along line 5—5 of FIG. 5, and wherein the crank follower roll is shown engaged within the transversely intersecting dual radius dwell slot, and wherein is illustrated the construction of the transverse intersecting radial dwell slot.

Referring now to FIG. 7 showing a bottom view of the carrier plate 25 taken along line 5—5 of FIG. 5, and being a part of this invention, there is shown that the carrier plate 25 is centrally aligned with the transfer center line TCL with transversely intersecting radii 97 and 98. The vector length of the radius 97 and the vector length of radius 98 is arrived at mathematically by the equation full stroke/2 in which, full stroke = the full stroke in inches required for the transfer bar 19 to perform its full forward stroke or full return stroke. A transversely intersecting dual radius dwell slot 26 is milled in carrier plate 25 axially and centrally along the aforesaid radii 97 and 98 to provide abutment dwell portion 99 and 100 for radius 97, and abutment dwell portion 101 and 102 for radius 98. Abutment dwell portion 99 and 100, and abutment portion 101 and 102 are to loosely receive follower roll 27 and provide zero acceleration at the point of juncture of the intersecting dual radius dwell slot 26.

Referring now to FIGS. 2, 4, 5 and 6 it is seen in FIG. 6 that, the shaft extension 39 has a shaft end 103 extending outwardly of the journalled ball bearing 46 housed in wall portion 48 of turret body 11. The ball bearing 46 is supported by end plate 104 secured to turret body 11 by screws 105. The shaft end 103 has positioning cam 106 and brake cam 107 keyed thereto and held thereon by nut 108. Furthermore, as the shaft extension 39 is rotably mounted to rotate with the crank turret 35, similarly the positioning cam 106 and brake cam 107 rotate therewith. Positioning limit switch 109 and brake limit switch 110 are mounted on end plate 104 as illustrated in FIG. 4. The positioning limit switch 109 carries a lever arm 111 and a roller 112. Similarly, brake limit switch 110 carries a lever arm 113 with a roller 114 mounted thereon. Positioning cam 106 has an elongated radial cam land portion 115 extending for approximately 168°, being terminated by cam lobes 116 and 117 laterally inward at each end to a radial sub-land portion 118. Similarly brake cam 107 has an elongated radial cam land portion 121 extending for approximately 168°, being terminated by cam lobes 122 and 123 laterally inward at each end to a radial sub-land portion 124.

LIMIT SWITCH OPERATION

In this invention when an epicyclic gear and crank follower roll mechanism is used coinjointly driven by a crank turret 35, such that; 168°-30'-38" clockwise rotation of crank turret 35 provide a full rectilinear forward stroke of carrier plate 25 and transfer bar 19: and reversely, 168°-30'-38" counterclockwise rotation of crank turret 35 provides a full rectilinear return stroke of carrier plate 25 and transfer bar 19.

Accordingly the operation of the carrier plate 25 and transfer bar 19 is cyclic from the extreme leftward position illustrated by dot and dash lines in FIG. 1, movable to the extreme right end position of the actuator body 10, again as viewed in FIG. 1. This reflects a complete cycle of operation of the carrier plate 25 and transfer bar 19.

At the start of a rectilinear forward stroke of the carrier plate 25 and transfer bar 19 the drive motor 16 is deenergized and the motor brake engaged, locking the crank turret 35 and epicyclic gear and crank follow roll means in fixed positions. To initiate a rectilinear forward cycle of the carrier plate 25 and transfer bar 19 in the described manner, the open contacts on the positioning limit switch 109 are bypassed by closing and holding a hand switch (not shown) to disengage the motor brake 17 and energize the drive motor 16 to drive the crank turret 35 in a clockwise direction whereby cam lobe 122 on brake cam 107 contacts roller 114 carried by lever arm 113 of the brake limit switch 110, and moves the switch 110 from a normally open position whereby contacts within the switch are closed to continue energization of drive motor 16 and disengagement of motor brake 17 whereby the crank turret 35 continues to rotate in a clockwise direction. Simultaneously therewith cam lobe 116 on positioning cam 106 contacts roller 112 carried by lever arm 111 of the positioning switch 109 and moves the switch 109 from a normally open position whereby contacts within the switch are closed.

As the crank turret 35 rotated its full 168°-30′-38″ full clockwise cycle the cam lobe 123 on brake cam 107 releases the roller 114 carried by lever arm 113 of the brake limit switch 110, and moves the closed contacts to a normally open position whereby the drive motor 16 is deenergized and its associated motor brake 17 is engaged to stop rotation of drive shaft 58 and maintain a preset torque on drive shaft 58. Simultaneously therewith cam lobe 117 on positioning cam 106 releases roller 112 carried by lever arm 111 of the positioning limit switch 109 and moves the closed contacts to a normally open position within the switch.

To initiate a rectilinear return cycle of the carrier plate 25 and transfer bar 19 in the described manner, the open contacts on the positioning switch 109 are bypassed by a motor reversing switch (not shown) operatively connected to a clamping mechanism such as shown in Kingsbury U.S. Pat. No. 3,561,749, and being in position for allowance of the transfer bar 19 return stroke as shown in FIG. 20 to FIG. 21 and FIG. 24 to FIG. 25. The aforesaid bypassing of the open contacts of positioning switch 109 and by reversing polarity or the like, to disengage the motor brake 17 and energize the drive motor 16 to drive the crank turret 35 in a counterclockwise direction, whereby cam lobe 123 on brake cam 107 contacts roller 114 carried by lever arm 113 of the brake limit switch 110, and moves the switch 110 from a normally open position whereby contacts within the switch are closed to continue energization of drive motor 16 and disengagement of motor brake 17 whereby the crank turret 35 continues to rotate in a counterclockwise direction. Simultaneously therewith cam lobe 117 on positioning cam 106 contacts roller 112 carried by lever arm 111 of the positioning switch 109 and moves the switch 109 from a normally open position whereby contacts within the switch are closed.

As the crank turret rotates its full 168°-30′-38″ counterclockwise cycle the cam lobe 122 on brake cam 107 releases the roller 114 carried by lever arm 113 of the brake limit switch 110, and moves the closed contacts to a normally open position, whereby the drive motor 16 is deenergized and its associated motor brake 17 is engaged to stop rotation of drive shaft 58 and maintain a preset torque on drive shaft 58. Simultaneously therewith cam lobe 116 on positioning cam 106 releases roller 112 carried by lever arm 111 of the positioning limit switch 109 and moves the closed contacts to a normally open position within the switch, reversing the polarity of the motor 16 to its original direction of clockwise drive of the crank turret 35. This completes the cycle of operation of the crank turret 35 and provides a full forward and return rectilinear stroke of carrier plate 25 and transfer bar 19.

It is to be noted that the positioning limit switch 109 is adapted to be used for shutting down the operation of the crank turret 35 after a complete cycle of operation as well as to provide a signal that the crank turret 35 has completed its cycle.

In this invention when an epicyclic gear and crank follower roll mechanism is used to provide the means for a rectilinear forward stroke and a rectilinear reverse stroke for a carrier plate is utilized; and to further provide a crank follower roll dwell means at the completion of the rectilinear forward stroke of the carrier plate to absorb kinetic energy of the drive mechanism, and still further to provide a crank follower dwell means at the completion of the rectilinear reverse stroke of the carrier plate to absorb kinetic energy of the drive mechanism.

Therefore, in this invention a gear ratio must be selected for the epicyclic gearing, whereby; with less than 180° rotation of the crank turret about its rotative axis, the crank pinion stud 32 carried in the crank turret 35 describes a circular path and causes the attached crank pinion gear 36 in mesh with internal gear 38 to revolve 180° within the internal gear 38 and thereby the attached crank arm 30 and crank pin 28 and follower roll 27 revolve 180° likewise. It is to be noted that the number of teeth on the crank pinion gear 36 and the internal gear 38 may be selected for the degrees of rotation desired for the crank turret 35 by the equation:

$$A/B \times 360° = \text{degrees rotation for crank turret 35,}$$

in which,

A = number of teeth in crank pinion gear 36:
B = number of teeth in internal gear 38.

Figure 11:
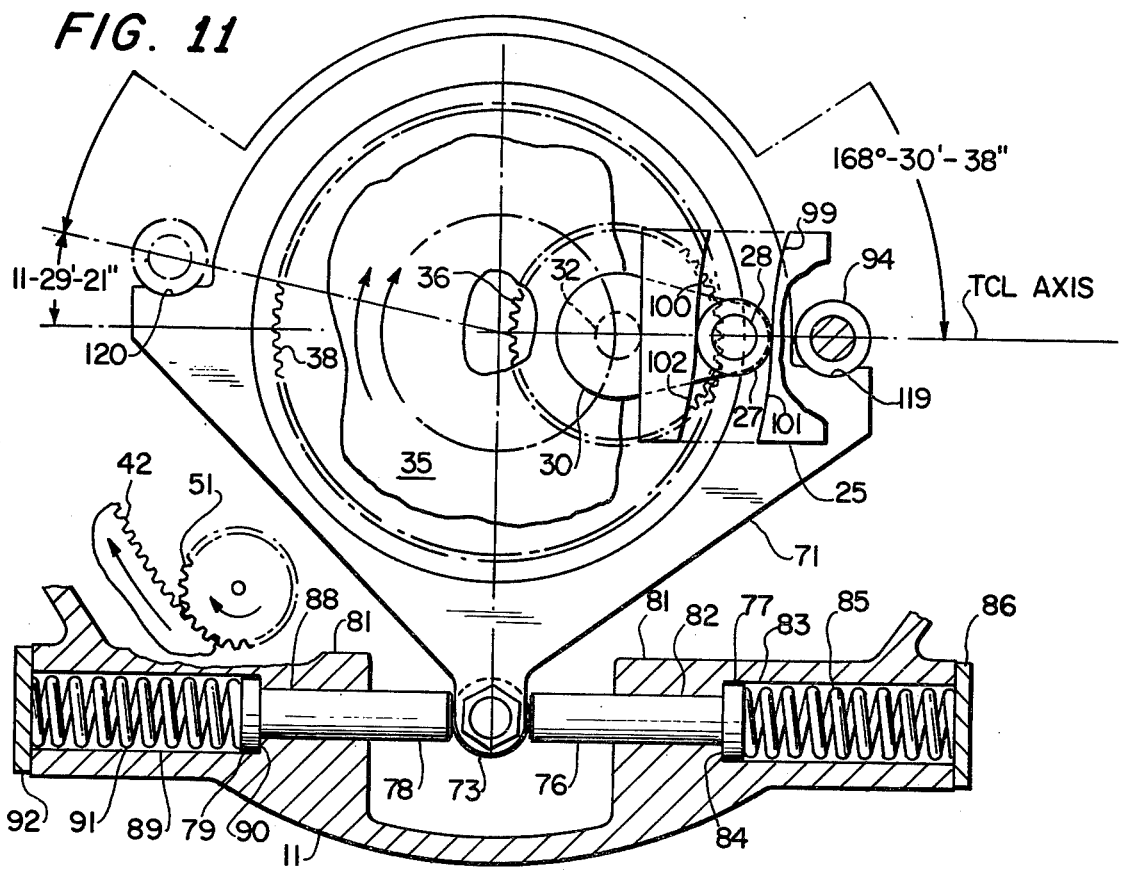
Figure 16:
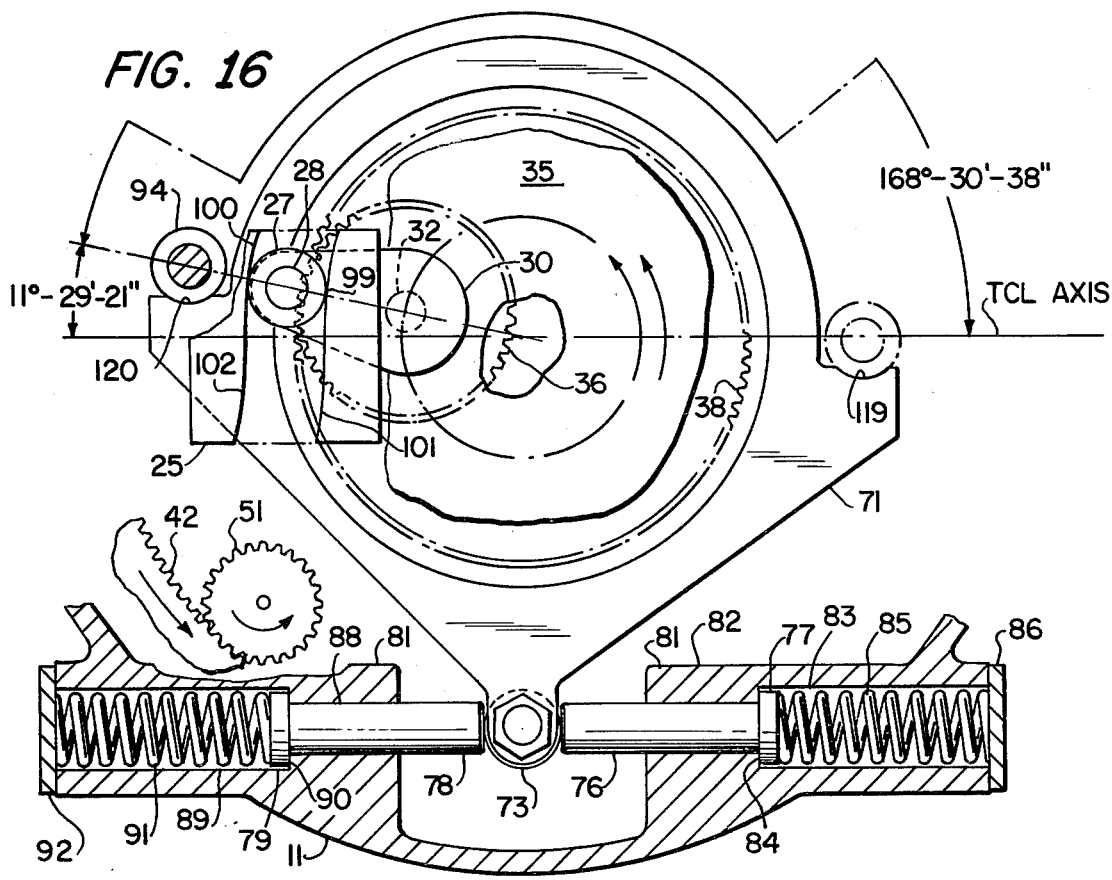

In this invention as best illustrated in FIG. 1, 11 and 16, the gear ratio selected for the epicyclic gearing is such that; the crank pinion gear 36 has 44 external teeth, in mesh with internal gear 38 which has 94 internal teeth, whereby: from the aforesaid equation: A/B × 360° = degrees rotation of crank turret 35, whence we know that the degrees rotation for the crank turret 35 is 168°-30′-38″ as the crank pinion gear 36 revolves 180° within the internal gear 38.

OPERATION

As best illustrated in FIG. 1 the crank turret 35 has its rotational axis centrally in alignment with the transfer center line axis TCL. The crank turret 35 and attached follower roll 94 is rotatively cyclic from the extreme leftward position illustrated by dot and dash lines in FIG. 1 and rotatable to the extreme right end of the transfer center line TCL and rotatively returned to the leftward position again as viewed in FIG. 1. This reflects a complete 168°-30′-38″ clockwise forward cycle to the right end of the transfer center line axis TCL and a complete 168°-30′-38″ counterclockwise return cycle to the extreme leftward position.

Figure 12:
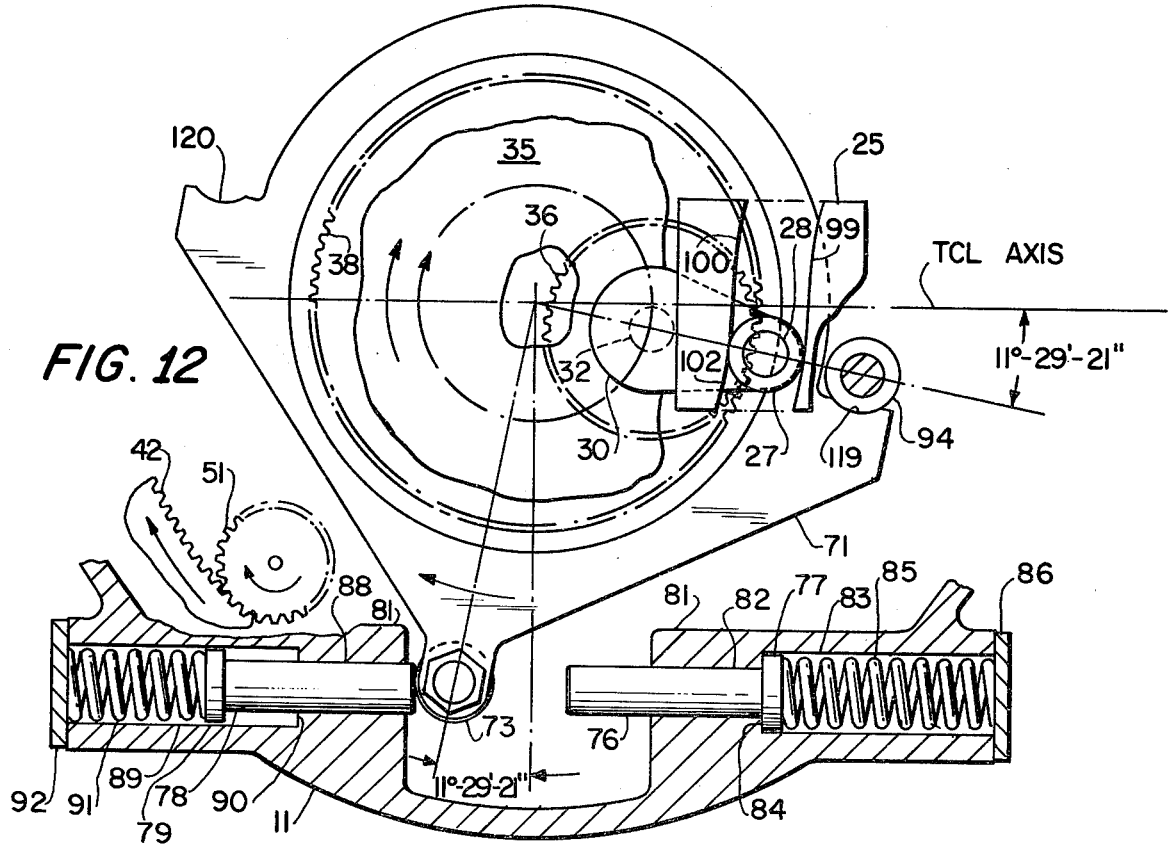
Figure 17:
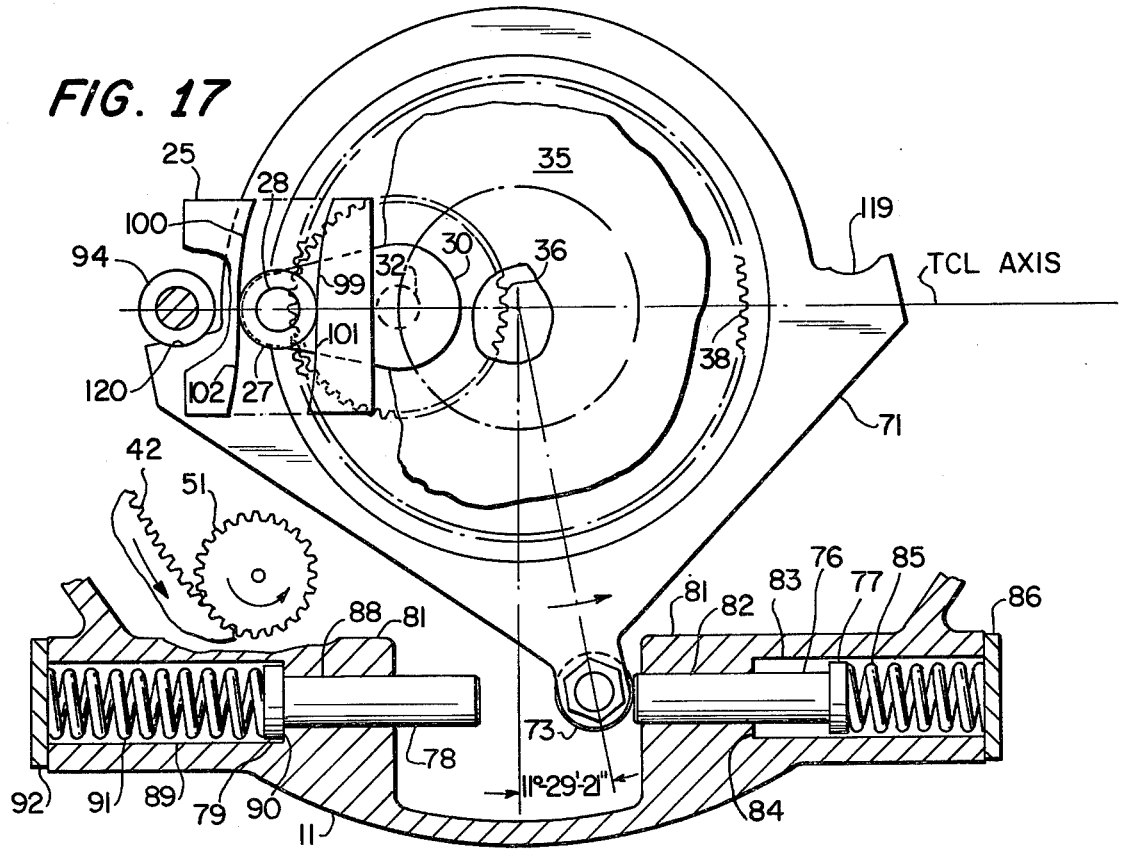

The aforesaid crank turret 35 carries a crank pinion stud 32 axially in alignment with follower roll 94 and outwardly displaced from the crank turret 35 rotational axis for rotation therewith in a manner that at the ending of the 168°-30′-38″ clockwise forward cycle of the crank turret 35, the crank pinion stud 32 has its rotational axis centrally in alignment with the transfer center line axis TCL. At the start and ending of the 168°-30′-38″ clockwise forward cycle or the 168°-30′-38″ counterclockwise return cycle, the crank pinion stud 32 and extended crank arm 30 with attached follower roll 27 and crank pin 28 are axially in alignment with the rotational axis of crank turret 35 and attached follower roll 94. such that: follower roll 27 is radially displaced from the rotative axis of crank turret 35 the same vector length as the vector length of radius 97 and 98 of carrier plate 25 as shown in FIG. 7. From the foregoing it can be seen that with rotation of the crank turret 35 in a complete 168°-30′-38″ clockwise sub-cycle or a complete 168°-30′-38″ counterclockwise sub-cycle that the follower roll 27 is displaced in a forward and backward movement about the rotational axis of carnk turret 35, such that; the aforesaid follower roll 27 in abutment dwell portions 101 and 102 of carrier plate 25 transmits to carrier plate 25 a rectilinear forward and backward movement throughout its full forward and return stroke. As best shown in FIG. 12 with further clockwise rotation of the crank turret 35, the aforesaid follower roll 27 is carried rotatively by crank arm 30 in abutment dwell portions 101 and 102 of carrier plate 25 to provide a positive stop and dwell means at the termination of the carrier plate 25 rectilinear forward movement or forward stroke, wherein; the aforesaid further clockwise rotation of crank turret 35 and engagement of follower roll 94 in arcuate slot 119 of centering arm 71 provides accompanying clockwise rotation of the centering arm 71 and attached follower roll 73 from its former bilateral preloaded condition, such that; the follower roll 73 forcefully moves the stop plunger 78 and head portion 79 to further compress the compression spring 91 to absorb kinetic energy of the drive mechanism and prevent damage. Additionally as best shown in FIG. 17 with further counterclockwise rotation of the crank turret 35, the aforesaid follower roll 27 is carried rotatively by crank arm 30 in abutment dwell portions 99 and 100 of carrier plate 25 to provide a positive stop and dwell means. At the termination of the carrier plate 25 rectilinear backward movement or return stroke, wherein; the aforesaid further counterclockwise rotation of crank turret 35 and engagement of follower roll 94 in arcuate slot 120 of centering arm 71 provides accompanying counterclockwise rotation of the centering arm 71 and attached follower roll 73 from its former bilateral preloaded condition, such that; the follower roll 73 forcefully moves the stop plunger 76 and head portion 77 to further compress the compression spring 85 to absorb kinetic energy of the drive mechanism and prevent damage.

In FIGS. 8 to 12 are shown the mechanical cooperation of members of this invention, during the course of a rectilinear forward movement of carrier plate 25 throughout its full forward stroke; and, in FIGS. 13 to 17 are shown the mechanical cooperation of members of this invention, during the course of a rectilinear return movement of carrier plate 25 throughout its full return stroke. In the illustrated form the parts are symmetrical and the crank turret 35 may be rotated in either direction by reversing the rotation of its drive shaft 58. In these figures, the actuator body 10, the transfer bar carriage 20 and stationary monorail 21 is assumed removed, while leaving the transversely intersecting radii 97 of abutment dwell slot portions 99 and 100 and radii 98 of abutment dwell slot portions 101 and 102 of carrier plate 25 in position for cooperating with the follower roll 27. Also in these figures part of the crank turret 35 is assumed removed while leaving the attached follower roll 94 in position for engagement with arcuate slots 119 and 120 of centering arm 71. The crank turret 35 carries a crank pinion stud 32 axially in alignment with follower roll 94 and outwardly displaced from the crank turret 35 rotational axis for rotation therewith, such that; in FIGS. 9 to 11 and FIGS. 14 to 16, when the crank turret 35 is revolved by the drive shaft 58, the crank pinion stud 32 describes a circular path, as indicated by the arrows, thus causing crank pinion gear 36 to revolve with the crank pinion stud 32 around the internal gear 38 in a manner that the crank arm 30 and attached crank pin 28 and follower roll 27 transmits through the cooperating dwell slot portions 99 and 100 or 101 and 102 of carrier plate 25, a rectilinear forward stroke or return stroke movement of the said carrier plate 25. It can readily be seen that the follower roll 27, crank arm 30, crank pinion stud 32 and crank pinion gear 36 are rotatably mounted in crank turret 35, such that; with the crank pinion gear 36 in geared engagement with internal gear 36, carried by centering arm 71, and whereby; the centering arm 71 and attached follower roll 73 are in a bilateral preloaded condition, that provision is afforded; to immobilize the centering arm 71 and internal gear 38 throughout a forward rectilinear stroke or return rectilinear stroke of the carrier plate 25, and reversely, it can be seen that with the carrier plate 25 forcefully being detained in its forward rectilinear stroke or return rectilinear stroke that the geared arrangement heretofore described will rotatively move the internal gear 38, the centering arm 71 and attached follower roll 73 from their former immobile position or bilateral preloaded condition, such that; in a forward rectilinear stroke of carrier plate 25, the follower roll 73 forcefully moves the stop plunger 78 and head portion 79 to further compress the compression spring 91 to absorb kinetic energy of the drive mechanism and prevent damage, and such that; in a return rectilinear stroke of carrier plate 25, the follower roll 73 forcefully moves the stop plunger 76 and head portion 77 to further compress the compression spring 85 to absorb kinetic energy of the drive mechanism and prevent damage.

Figure 8:
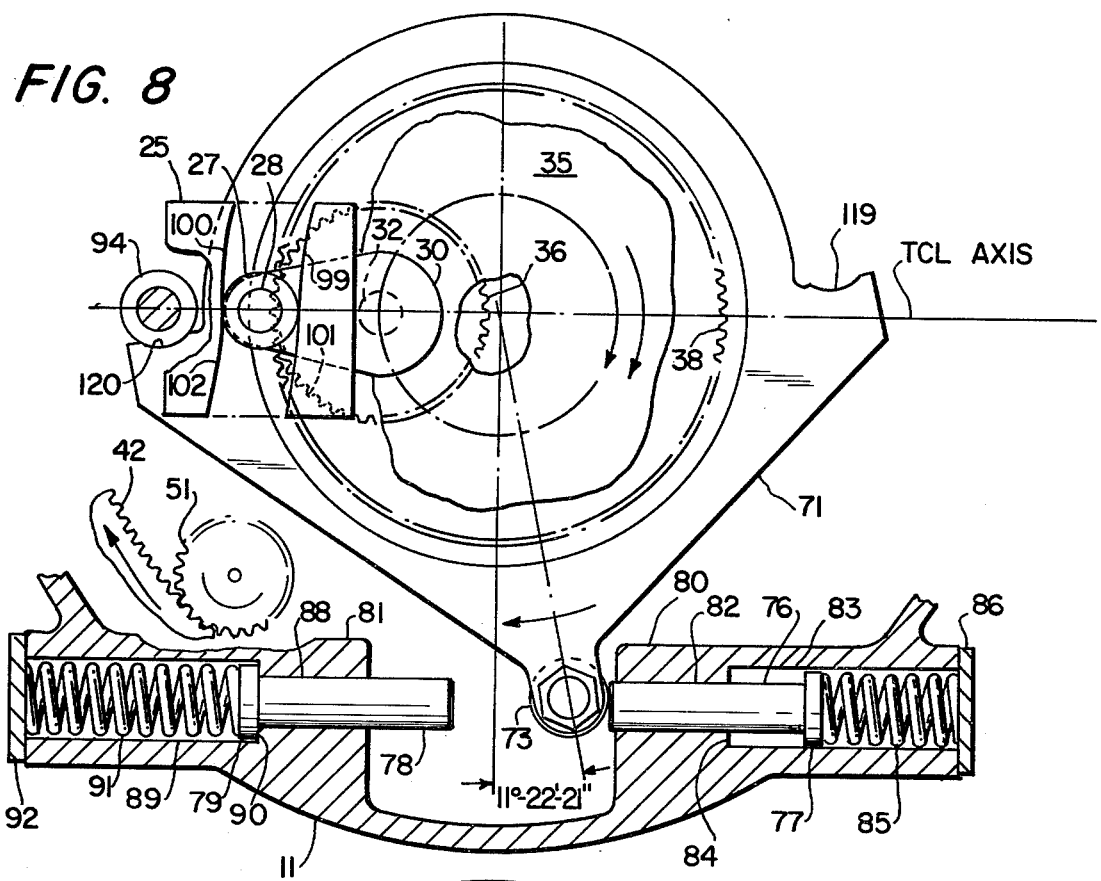
FIGS. 8 to 12 are successive diagrammatic views showing the mechanical parts during the course of a forward traversing operation and dwell interval.

FIG. 8 represents the parts with the carrier plate 25 in its full return position as shown in FIG. 17, but wherein; the drive motor 16 is energized and its associated motor brake 17 is disengaged whereby the drive shaft 58 is rotated to cause the crank turret 35 and centering arm 71 and associated members to rotate in a clockwise direction as shown by the arrows.

FIG. 9 represents the parts with the carrier plate 25 in its full return position, such that; the crank turret 35 and attached follower roll 94 in arcuate slot 120 of centering arm 71 has provided a stop and dwell means for the carrier plate 25, wherein; clockwise rotation of 11°-29'-21" of the crank turret 35 carrying the follower roll 27 rotatively in the abutment dwell slots 99 and 100 of carrier plate 25, likewise provides; accompanying clockwise rotation of 11°-29'-21" of the centering arm 71 and attached follower roll 73 from its former lateral preloaded condition as shown in FIG. 8, such that; the compression spring 85 forcefully moves the stop plunger 76 and head portion 77 to bear on follower roll 73 attached to centering arm 71 and return the centering arm and attached follower roll 73 to its former bilateral preloaded condition. During this time that the follower roll 27 is passing rotatively along radii 97 in abutment dwell slots 99 and 100 of carrier plate 25 which have their curved surfaces concentric during this period with the rotative axis of crank turret 35, such that; in the position of FIG. 9, the follower roll 27 is ready to begin action against abutment dwell slot 99 to affect a rectilinear forward movement of carrier plate 25, whereby; with disengagement of follower roll 94 and arcuate slot 120 of centering arm 71, the internal gear 38 attached to centering arm 71 remains immobile in a bilateral preloaded condition.

Figure 10:
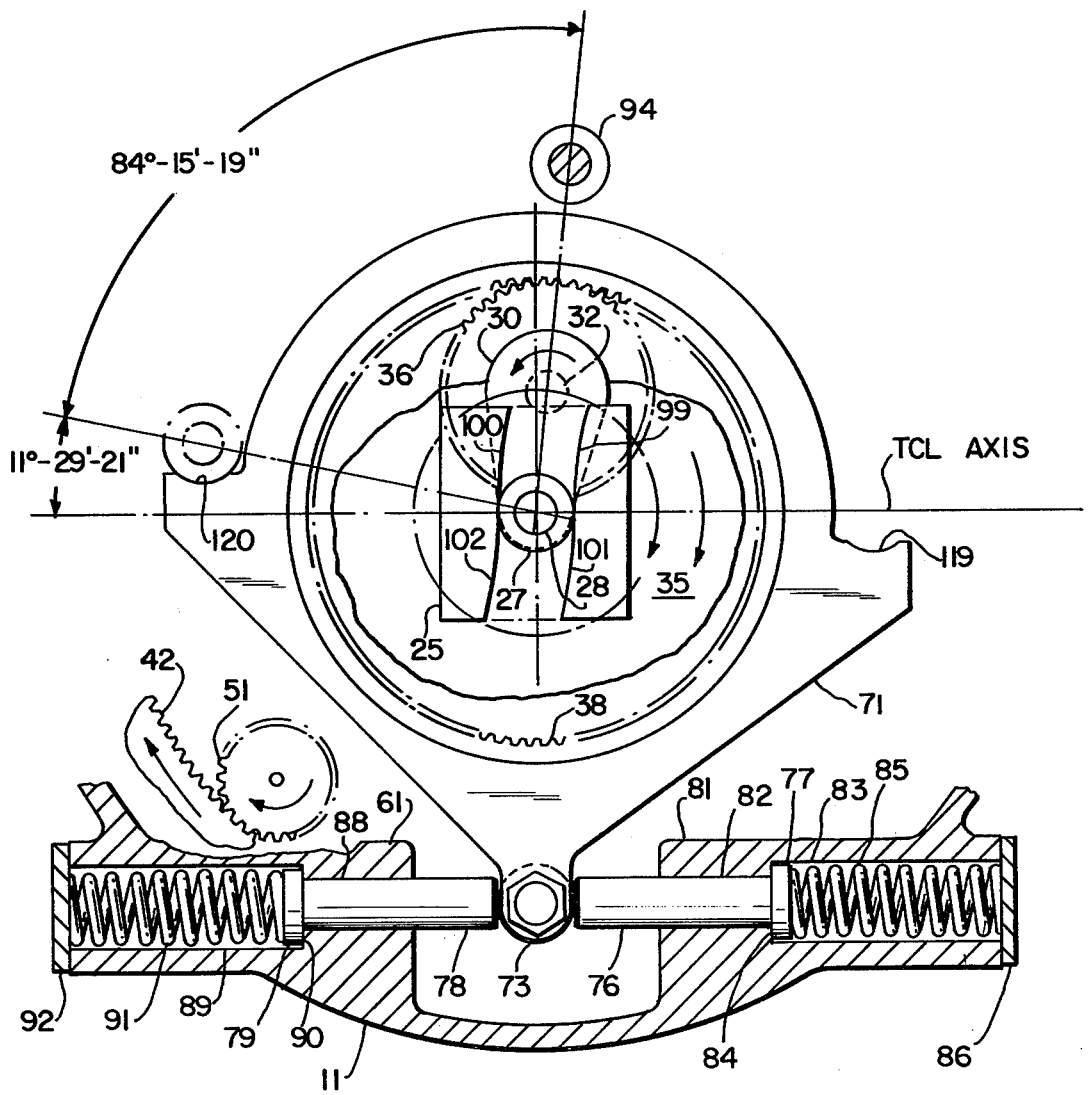

During the first 84°-15'-19" clockwise rotation of crank turret 35 and attached follower roll 94 into the position of FIG. 10: with similar movement of the outwardly displaced crank pinion stud 32 describing a circular path, as indicated by the arrows. The crank pinion gear 36 is carried by the crank pinion stud 32 and revolves 90° around the immobile and bilaterally preloaded internal gear 38 in a counterclockwise direcion in a manner that the crank arm 30 and attached crank pin 28 and follower roll 27 will be in the center of internal gear 38 and centrally in position abutting the transversely intersecting radii 97 and 98 and abutment dwell slot portions 99, 100, 101, and 102 of carrier plate 25. During this time that the follower roll 27 is engaged in abutment dwell slots 99 and 100 of carrier plate 25 and into the position as shown in FIG. 10, the follower roll 27 acts on the abutment dwell slot 99 to cause a gradual acceleration of movements of the abutment dwell slot 99 and the carrier plate 25, that is best described as being a modified harmonic acceleration motion. It will be noted in FIG. 10 that the crank turret 35 has completed its first half cycle of rotation during the course of a rectilinear forward movement of carrier plate 25 throughout its full forward stroke, such that; the carrier plate 25 has been advanced half the distance of its full forward stroke.

During the next succeeding 84°-15'-19" clockwise rotation of crank turret 35 and attached follower roll 94 to a total 168°-30'-38" clockwise rotation into the position of FIG. 11: with a similar 84°-15'-19" movement of the outwardly displaced crank pinion stud 32 describing a circular path, as indicated by the arrows. The crank pinion gear 36 is carried by the crank pinion stud 32 and revolves 90° around the immobile and bilaterally preloaded internal gear 38 in a counterclockwise direction in a manner that the crank arm 30 and attached crank pin 28 and follower roll 27 revolves 90° also, and the extended crank arm 30 with attached follower roll 27 and crank pin 28 are axially in alignment with the rotational axis of crank turret 35 and the attached follower roll 94, such that; the follower roll 27 is centrally in alignment with transfer center line TCL and centrally in position abutting the transversely intersecting radii 97 and 98 and abutment dwell slot portions 99, 100, 101, and 102 of carrier plate 25. During this time that the follower roll 27 is engaged in abutment dwell slots 99, 100, 101, and 102 of carrier plate 25 and into the position of FIG. 11, the follower roll 27 acts on the abutment dwell slots 99, 100,101, and 102 to move the same but at a gradually decelerating rate that is best described as being a modified harmonic deceleration motion. It will be noted in FIG. 11 that the crank turret 35 has completed its second half cycle of rotation during the course of a rectilinear forward movement of carrier plate 25 throughout its full forward stroke, such that; the carrier plate has been advanced the full distance of its full forward stroke from its starting position as shown in FIG. 9.

It is to be noted that in the position shown in FIG. 11 the drive motor is deenergized and the associated motor brake 17 is operating to stop rotation of drive shaft 58.

FIG. 12 represents the parts with the carrier plate 25 in its full forward position, such that; the crank turret 35 and attached follower roll 94 in arcuate slot 119 of centering arm 71 has provided a stop and dwell means for the carrier plate 25, wherein; clockwise rotation of 11°-29'-11" of the centering arm 71 and attached follower roll 73 from its former bilateral preloaded condition, such that; the follower roll 73 has forecefully moved the stop plunger 78 and head portion 79 to further compress the compression spring 91 to absorb kinetic energy of the drive mechanism and prevent damage.

FIG. 13 represents the parts with the carrier plate 25 in its full forward position as shown in FIG. 12, but wherein; the drive motor 16 is energized and its associated motor brake is disengaged whereby the drive shaft 58 is rotated to cause the crank turret 35 and centering arm 71 and associated members to rotate in a counterclockwise direction as shown by the arrows.

FIG. 14 represents the parts with the carrier plate 25 in its full forward position, such that; the crank turret 35 and attached follower roll 94 in arcuate slot 119 of centering arm 71 has provided a stop and dwell means for the carrier plate 25, wherein; counterclockwise rotation of 11°-29'-21" of the crank turret 35 carrying the follower roll 27 rotatively in the abutment dwell slots 101 and 102 of carrier plate 25, likewise provides; accompanying counterclockwise rotation of 11°-29'-21" of the centering arm 71 and attached follower roll 73 from its former lateral preloaded condition as shown in FIG. 13, such that; the compression spring 91 forcefully moves the stop plunger 78 and head portion 79 to bear on follower roll 73 attached to centering arm 71 and return the centering arm 71 and attached follower roll 73 to its former bilateral preloaded condition. During this time that the follower roll 27 is passing rotatively along radii 98 in abutment dwell slots 101 and 102 of carrier plate 25 which have their curved surfaces concentric during this period with the rotating axis of crank turret 35, such that; in the position of FIG. 14, the follower roll 27 is ready to begin action against abutment dwell slot 100 and 102 to affect a rectilinear return movement of carrier plate 25, whereby; with disengagement of follower roll 94 and arcuate slot 119 of centering arm 71, the internal gear 38 attached to centering arm 71 remains immobile in a bilateral preloaded condition.

Figure 15:
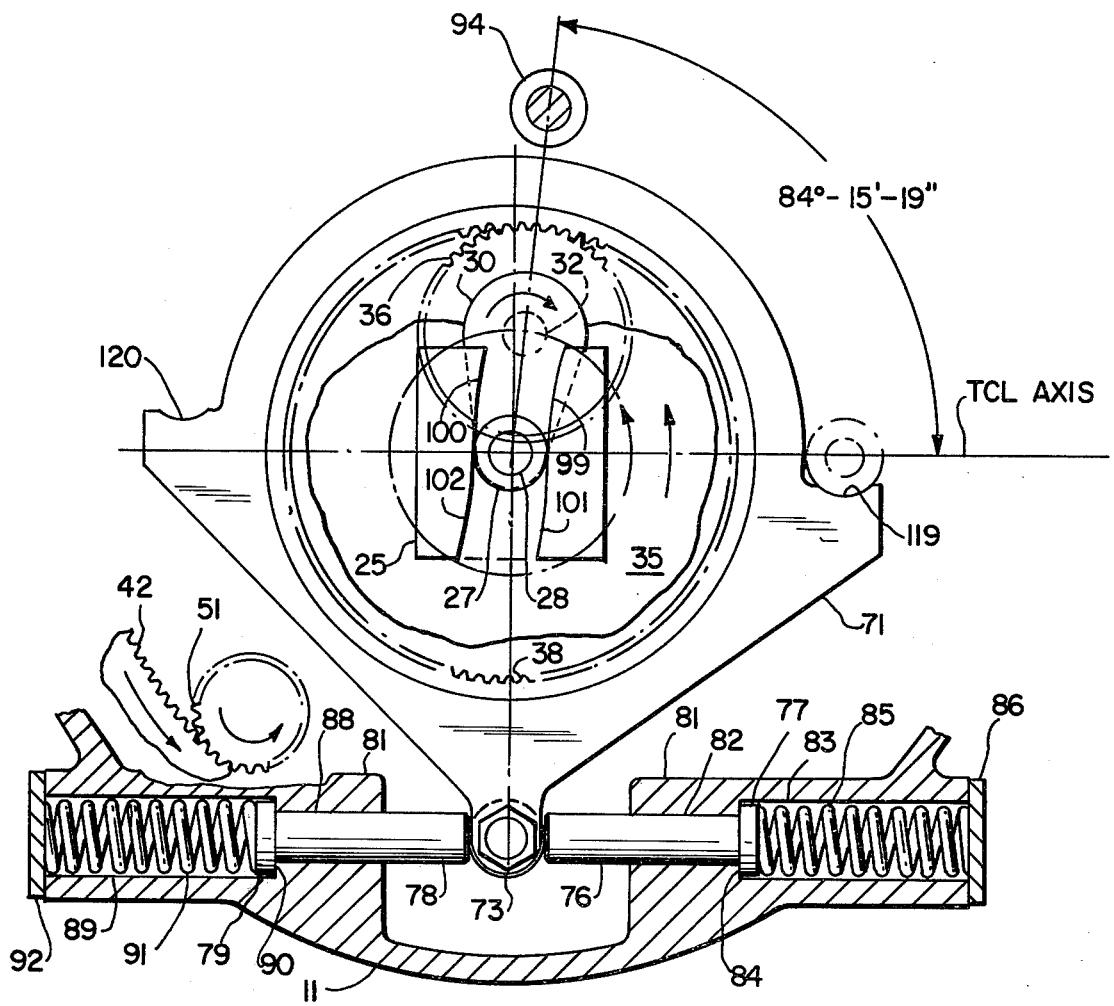

During the first 84°-15'-19" counterclockwise rotation of crank turret 35 and attached follower roll 94 into the position of FIG. 15: with similar movement of the outwardly displaced crank pinion stud 32 describing a circular path, as indicated by the arrows. The crank pinion gear 36 is carried by the crank pinion stud 32 and revolves 90° around the immobile and bilaterally preloaded internal gear 38 in a clockwise direction in a manner that the crank arm 30 and attached crank pin 28 and follower roll 27 revolves 90° also, and the follower roll 27 wil be in the center of internal gear 38 and centrally in position abutting the transversely intersecting radii 97 and 98 and abutment dwell slot portions 99, 100, 101 and 102 of carrier plate 25. During this time that the follower roll 27 is engaged in abutment dwell slots 99, 100, 101, and 102 of carrier plate 25 and into the position as shown in FIG. 15, the follower roll 27 acts on the abutment dwell slots 100 and 102 to cause a gradual acceleration of movements of the abutment dwell slots 100 and 101 and the carrier plate 25, that is best described as being a modified harmonic acceleration motion. It will be noted in FIG. 15 that the crank turret 35 has completed its first half cycle of rotation during the course of a rectilinear return movement of carrier plate 25 throughout its full return stroke, such that; the carrier plate 25 has been return half the distance of its full return stroke.

During the next succeeding 84°-15'-19" counterclockwise rotation of crank turret 35 and attached follower roll 94 to a total 168°-30'-38" counterclockwise rotation into the position of FIG. 16: with a similar 84°-15'-19" movement of the outwardly displaced crank pinion stud 32 describing a circular path, as indicated by the arrows. The crank pinion gear 36 is carried by the crank pinion stud 32 and revolves 90° around the immobile and bilaterally preloaded internal gear 38 in a clockwise direction in a manner that the crank arm 30 and attached crank pin 28 and follower roll 27 revolves 90° also, and the extended crank arm 30 with attached follower roll 27 and crank pin 28 are axially in alignment with the rotational axis of crank turret 35 and the attached follower roll 94, such that; the follower roll 27 is centerally in position along radius 97 in abutment dwell slots 99 and 100 of carrier plate 25. During this time that the follower roll 27 is engaged in abutment dwell slots 99 and 100 of carrier plate 25 and into the position of FIG. 16, the follower roll 27 acts on the abutment dwell slots 99 and 100 to move the same but at a gradually decelerating rate that is best described as being a modified harmonic deceleration motion. It will be noted in FIG. 16 that the crank turret 35 has completed its second half cycle of rotation during the course of a rectilinear return movement of carrier plate 25 throughout its full return stroke, such that; the carrier plate 25 has been returned the full distance of its full return stroke.

It is also to be noted that in the position shown in FIG. 16, the drive motor 16 is deenergized and the associated motor brake 17 is operative to stop rotation of drive shaft 58.

FIG. 17 represents the parts with the carrier plate 25 in its full return stroke position, such that; the crank turret 35 and attached follower roll 94 in arcuate slot 120 of centering arm 71 has provided a stop and dwell means for the carrier plate 25, wherein; counterclockwise rotation of 11°-29′-21″ of the crank turret 35 carrying the follower roll 27 rotatively in the abutment dwell slots 99 and 100 of carrier plate 25, likewise provides; accompanying counterclockwise rotation of 11°-29′-11″ of the centering arm 71 and attached follower roll 73 from its former bilateral preloaded condition, such that; the follower roll 73 has forcefully moved the stop plunger 76 and head portion 77 to further compress the compressing spring 85 to absorb kinetic energy of the drive mechanism and prevent damage.

TRANSFER BAR ACTUATOR UNIT OPERATION

The transfer bar actuator unit as shown and illustrated in FIGS. 18 to 25 has its transfer bar 19 equipped with equally spaced fixed pilot pins PP, PP-A, and PP-B adapted to successively receive loosely mounted thereto work pieces WP-A and WP-B. The actuator body 10 and mounting platform 18 are attached to transfer machine base TMB. The transfer machine base TMB is illustrated as having two working stations WS-A and WS-B coaxially in alignment with a clamp drive mechanism CD-A and CD-B. Such a clamping mechanism is shown with general parts in Kingsbury U.S. Pat. No. 3,561,749. The clamp drive mechanism CD-A and CD-B have clamp yokes CY-A and CY-B to forcefully engage and move vertically the work pieces WP-A and WP-B from the transfer bar 19 with disengagement of pilot pins PP, PP-A or PP-B therefrom, to work nest WN-A and WN-B in clamp plate CP, or reversely lower vertically the work pieces WP-A and WP-B to transfer bar 19 and reengage pilot pins PP, PP-A, or PP-B.

A sequence of operation to advance work piece WP-A to working station WS-A, and therewith; vertically move and clamp the work piece WP-A to work nest WN-A and return the transfer bar 19 to its initial starting position is illustrated in FIGS. 18 to 21.

Figure 18:
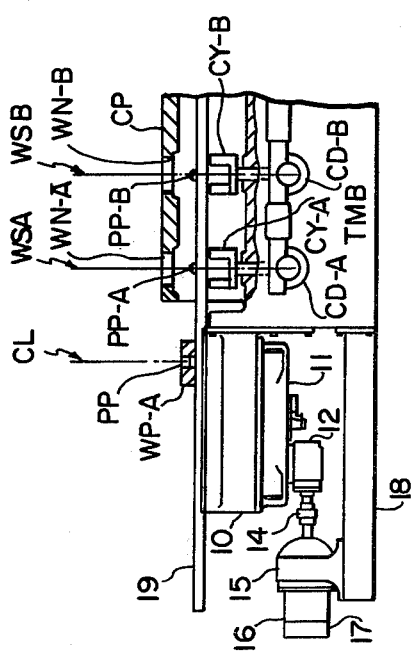

FIG. 18 represents the parts with the transfer bar 19 in its full return stroke position and the clamp drive mechanism CD-A and CD-B has lowered vertically the clamp yokes CY-A and CY-B, such that; a work piece WP-A is loosely mounted manually (or otherwise) on pilot pin PP of transfer bar 19, coincident with machine center line CL.

Figure 19:
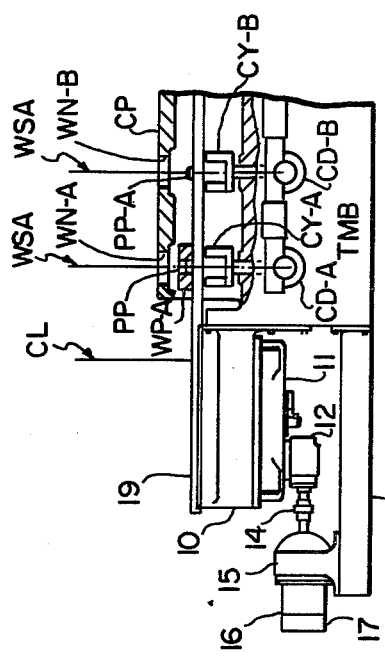
FIGS. 18 to 21 are successive views showing an automatic machine tool and a mode of operation and the structural arrangement of the parts required for affecting a working cycle in which a first workpiece on a transfer bar is advanced to a working station and being clamped thereto, after which the transfer bar returns to its original position.

FIG. 19 represents the parts in the same position as shown in FIG. 18, but wherein; the transfer bar 19 carrying pilot pin PP and work piece WP-A has moved its full forward stroke to align the pilot pin PP and work piece WP-A with working station WS-A.

Figure 20:
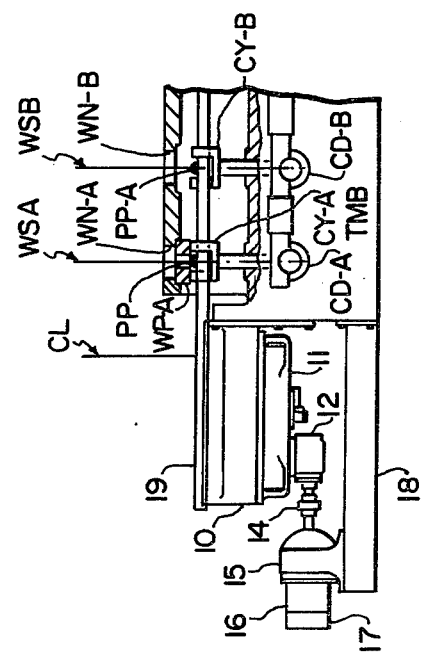

FIG. 20 represents the parts in the same position as shown in FIG. 19, but wherein; the clamp drive mechanisms CD-A and CD-B have move vertically the clamp yokes CY-A and CY-B to their clamping position, such that; the clamp yoke CY-A has forcefully engaged and vertically moved the work piece WP-A from the transfer bar 19, with disengagement of pilot pin PP therefrom, to work nest WN-A in clamp plate CP.

Figure 21:
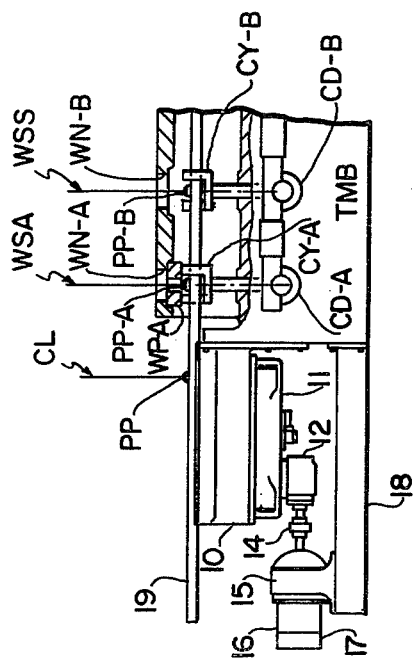

FIG. 21 represents the parts in the same position as shown in FIG. 20, but wherein; the transfer bar 19 carrying pilot pins PP, PP-A and PP-B has moved its full return stroke to align the pilot pin PP coincident with the machine center line CL.

A sequence of operations to advance a second work piece WP-B to working station WS-A and subsequently advance work piece WP-A to working station WS-B, and therewith; vertically move and clamp the work pieces WP-A and WP-B to work nest WN-A and WN-B and return the transfer bar 19 to its initial starting position is illustrated in FIGS. 22 to 25.

Figure 22:
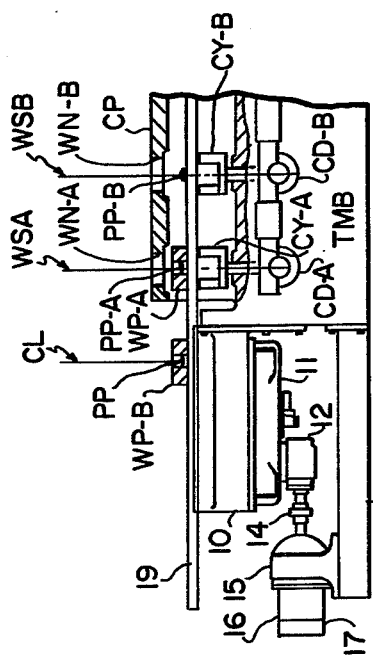
FIGS. 22 to 25 are successive views similar to FIGS. 18 to 21 in which in a succeeding work cycle a second workpiece on a transfer bar and the first workpiece being lowered to the transfer bar, are advanced to adjacent work stations and being clamped thereto, after which the transfer bar returns to its original position.

FIG. 22 represents the parts in the same position as shown in FIG. 21, but wherein; the clamp drive mechanisms CD-A and CD-B have lowered vertically the clamp yokes CY-A and CY-B, such that; work piece WP-A in engagement with clamp yoke CY-A is vertically lowered from work nest WN-A to loosely engage pilot pin PP-A of transfer bar 19. A second work piece WP-B is loosely mounted manually (or otherwise) on pilot pin PP of transfer bar 19, coincident with machine center line CL.

Figure 23:
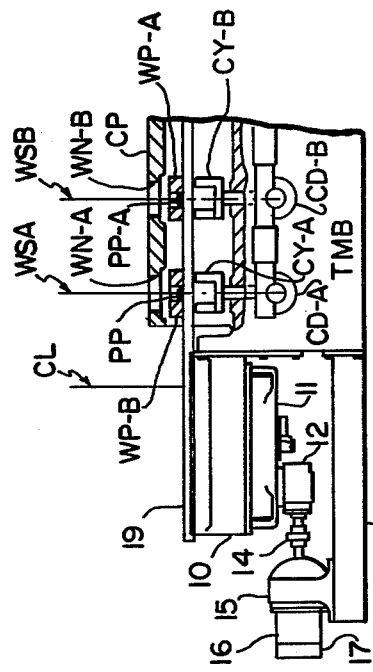

FIG. 23 represents the parts in the same position as shown in FIG. 22, but wherein; the transfer bar 19 carrying pilot pins PP and PP-A and work pieces WP-A and WP-B has moved its full forward stroke to align pilot pin PP and work piece WP-A with working station WS-A, and pilot pin PP-A and work piece WP-B with working station WS-B.

Figure 24:
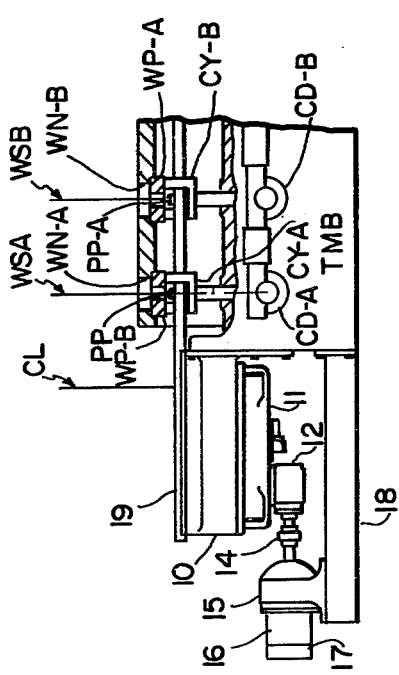

FIG. 24 represents the parts in the same position as shown in FIG. 23, but wherein; the clamp drive mechanisms CD-A and CD-B have moved vertically the clamp yokes CY-A and CY-B to their clamping porition, such that; the clamp yokes CY-A and CY-B have forcefully moved the work pieces WP-A and WP-B from the transfer bar 19, with disengagement of pilot pins PP and PP-A therefrom, to work nests WN-A and WN-B in clamp plate CP.

Figure 25:
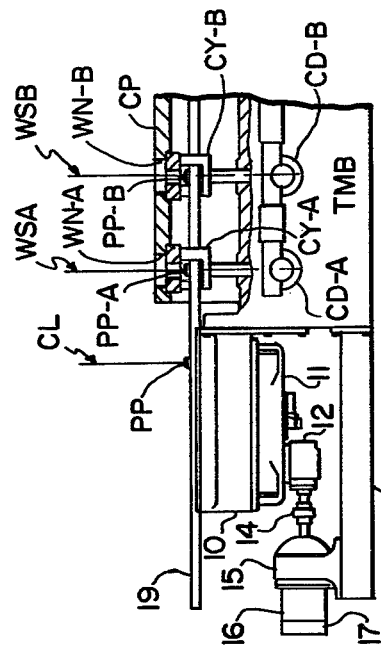

FIG. 25 represents the parts in the same position as shown in FIG. 24, but wherein; the transfer bar 19 carrying the pilot pins PP, PP-A, and PP-B has moved its full return stroke to align the pilot pin PP coincident with machine center line CL.

While a preferred embodiment of the present invention has been illustrated and described above, various additions, substitutions, modifications and omissions may be made thereto without departing from the spirit and scope thereof as defined in the appended claims.

I claim:

1. A transfer bar actuator unit for a machine tool or like unit comprising a body portion, a stationary monorail, a transfer bar carriage supported upon said stationary monorail for linear movement therealong, a transfer bar carried by said transfer bar carriage and movable linearly therewith, a carrier plate likewise carried by said transfer bar carriage and movable linearly therewith, a turret body portion fixed to said actuator body portion and having a crank turret rotatably supported by said turret body portion for limited rotation therein, said crank turret including epicyclic gear and crank follower roll mechanism means rotatably supported within said crank turret, said epicyclic gear and crank follower roll mechanism means providing a means from which a reciprocating linear motion is imparted to said carrier plate, said epicyclic gear and crank follower roll mechanism means having a crank pinion stud supported within the said crank turret and outwardly displaced from the said crank turret rotational axis, said crank pinion stud having at one end a crank arm and extended crank follower roll means drivingly engagingly said carrier plate; and the other end having a crank pinion gear drivingly engaging an internal gear also rotatably supported by said crank turret, said internal gear carries a centering arm and centrally extended follower roll means rotatably mounted about the said crank turret having the said centrally extended follower roll means bilaterally engaging opposed preloaded compression spring plungers slideably mounted in said turret body portion and characterized by a bilaterally preloaded driving connection between said internal gear and said crank follower roll means through said epicyclic gear means, means operatively connecting said crank turret for limited clockwise or counterclockwise rotation around said centering arm, said crank turret having a follower roll radially secured thereto for rotating therewith in a limited clockwise or counterclockwise rotation whereby to engage arcuate slots radially spaced apart in said centering arm, driving means carried by and supported within said turret body portion providing said crank turret limited clockwise or counterclockwise rotation around said centering arm, said driving means having an output shaft extending within said turret body portion and having a pinion gear thereon one end drivingly engaging a crank turret gear affixed to said crank turret; and the other end of said output shaft is provided a bevel gear drivingly engaging a second bevel gear on an input shaft, said input shaft being rotatably supported in a gear housing portion fixed to said turret body portion and extending through and coupled to a gear reducer by universal joint means, said gear reducer is in couple with a reversible drive motor and attached motor brake, said drive motor drivingly engages said input shaft through the said gear reducer.

2. The mechanism of claim 1 wherein said crank follower roll means includes a roll member being engaged in a transversely intersecting dual radius dwell slot in said carrier plate.

3. A combined drive in accordance with claim 2, in which means operatively connecting said crank turret for limited clockwise or counterclockwise rotation around said centering arm is provided, said crank turret having a follower roll radially secured thereto for rotating therewith in a limited clockwise or counterclockwise rotation whereby to engage arcuate slots radially spaced apart in said bilaterally preloaded centering arm, whereby; with deenergization of the said drive motor and the associated motor brake operative at the ending of said limited clockwise rotation to produce a modified harmonic motion linear forward stroke of said transfer bar and the said follower roll secured to the said crank turret forcefully, engaging the said arcuate slot in said centering arm, wherein; said crank turret and said epicyclic gear and crank follower roll means have a common axis of operation, and said crank follower roll rotates about an axis disposed normal to said common axis to provide a stop and dwell position means for said transfer bar throughout a deceleration interval of said motor brake, and reversibly; with deenergization of the said drive motor and associated motor brake operative at the ending of said limited counterclockwise rotation to produce a modified harmonic motion linear return stroke of said transfer bar and the said follower roll secured to the said crank turret forcefully engaging the said arcuate slot in said centering arm.

4. The mechanism of claim 1 or claim 3 wherein the bilaterally opposed preloaded spring plungers comprise a centering device to immobilize the said centrally extended follower roll means and said centering arm and attached gear with said centrally extended follower roll biased against adjacent pretensioned spring plungers and adapted to forcefully move adjacent spring plungers and further pretension the same throughout the stop and dwell position means for said transfer bar, whereby; to absorb kinetic energy of the drive mechanism and prevent damage thereto.

5. A transfer bar actuator unit for a machine tool or like unit having a linearly movable transfer bar, comprising a motorized mechanism to linearly move said transfer bar in forward and return strokes, including a reversible drive motor and motor brake, said reversible drive motor provided with means connecting the same to provide limited clockwise or counterclockwise rotation of a crank turret, and wherein; at the ending of said limited clockwise or counterclockwise rotation of said crank turret the drive motor is deenergized and the associated motor brake is operative, said crank turret being drivingly connected to an epicyclic gear and crank follower roll mechanism means, and bilaterally preloaded centering arm and spring plunger means for biasingly resisting the clockwise and counterclockwise rotation of said crank turret through a centering arm of said bilaterally preloaded centering arm and spring plunger means carried by said crank turret, and means connecting the said follower roll mechanism means to the said transfer bar to drive the latter, whereby; the said reversible drive motor provides limited clockwise rotation of said crank turret to produce a modified harmonic motion linear forward stroke of said transfer bar, and reversibly the said reversible drive motor provides limited counterclockwise rotation of said crank turret to produce a modified harmonic motion linear return stroke of said transfer bar.

6. A mechanism for translating rotational motion to linear motion comprising a turret, means for rotating said turret about a first axis, a crankshaft, means mounting said crankshaft for rotation relative to said turret about a second axis generally parallel to but offset from said first axis, a crank arm carried by said crankshaft and being disposed in transverse relationship to said second axis, a driven element, means for guiding the driven element for movement along a generally linear path, said crank arm having a driving element for driving said driven element upon rotation of said turret, said driving element having a third axis generally parallel to but offset from said first and second axes, said driving element being moved upon the the rotation of said turret between first and second generally diametrically opposite positions relative to the arc of rotation of said turret, said first, second and third axes lying in common plane in the first and second positions of said driving element, means for absorbing the momentum of a load driven by said driven element when said driving element is contiguous said first and second positions, said momentum absorbing means including a pair of cooperative abutment members, one of said abutment members being carried by said turret for movement thereby generally between said first and second positions, gear means meshingly interconnecting another of said abutment members and said crankshaft, said one abutment member being effective to contact and move said another abutment member upon said driving element moving contiguous said first and second positions, and means yielding against the movement of said another abutment member thereby absorbing the momentum transferred thereto from said turret through said meshed gear means.

7. The mechanism as defined in claim 6 wherein said gear means includes a ring gear carried by said turret in mesh with a gear carried by said crankshaft.

8. The mechanism as defined in claim 6 wherein said gear means includes a ring gear carried by said turret in mesh with a gear carried by said crankshaft, and said another abutment member is carried by said ring gear.

9. The mechanism as defined in claim 6 wherein said gear means includes a first gear fixed to and carried by said crankshaft and a second gear carried by and rotatable relative to said turret, and said another abutment member is carried by said second gear.

10. The mechanism as defined in claim 6 wherein said one abutment member has a fourth axis generally parallel to but offset from said first, second and third axes, and said fourth axis lies in said common plane with said first, second and third axes in the first and second positions of said driving element.

11. A mechanism for translating rotational motion to linear motion comprising a turret, means for rotating said turret about a first axis, a crankshaft, means mounting said crankshaft for rotation relative to said turret about a second axis generally parallel to but offset from said first axis, a crank arm carried by said crankshaft and being disposed in transverse relationship to said second axis, a driven element, means for guiding the driven element for movement along a generally linear path, said crank arm having a driving element for driving said driven element upon rotation of said turret, said driving element having a third axis generally parallel to but offset from said first and second axes, said driving elemet being moved upon the rotation of said turret between first and second generally diametrically opposite positions relative to the arc of rotation of said turret, said first, second and third axes lying in a common plane in the first and second positions of said driving element, means for absorbing the momentum of a load driven by said driven element when said driving element is contiguous said first and second positions, said momentum absorbing means including a pair of cooperative abutment members, one of said abutment members being carried by said turret for movement thereby generally between said first and second positions, gear means meshingly interconnecting another of said abutment members and said crankshaft, said one abutment member being effective to contact and move said another abutment member upon said driving element moving contiguous said first and second positions, means yielding against the movement of said another abutment member thereby absorbing the momentum transferred thereto from said turret through said meshed gear means, and said common plane is parallel to said linear path.

12. The mechanism as defined in claim 11, and said gear means include a ring gear carried by said turret in mesh with a gear carried by said crankshaft.

13. The mechanism as defined in claim 11 wherein said gear means includes a ring gear carried by said turret in mesh with a gear carried by said crankshaft, and said another abutment member is carried by said ring gear.

14. The mechanism as defined in claim 11 wherein said gear means includes a first gear fixed to and carried by said crankshaft and a second gear carried by and rotatable relative to said turret, and said another abutment member is carried by said second gear.

15. The mechanism as defined in claim 11 wherein said one abutment member has a fourth axis generally parallel to but offset from said first, second and third axes, and said fourth axis lies in said common plane with said first, second and third axes in the first and second positions of said driving element.

16. A mechanism for translating rotational motion to linear motion comprising a turret, means for rotating said turret about a first axis, a crankshaft, means mounting said crankshaft for rotation relative to said turret about a second axis generally parallel to but offset from said first axis, a crank arm carried by said crankshaft and being disposed in transverse relationship to said second axis, a driven element, means for guiding the driven element for movement along a generally linear path, said crank arm having a driving element for driving said driven element upon rotation of said turret, said driving element being moved upon the rotation of said turret between first and second generally diametrically opposite positions relative to the arc of rotation of said turret, means for absorbing the momemtum of a load driven by said driven element when said driving element is contiguous said first and second positions, said momentum absorbing including a pair of cooperative abutment members, one of said abutment members being carried by said turret for movement thereby generally between said first and second positions, gear means meshingly interconnecting another of said abutment members and said crankshaft, said one abutment member being effective to contact and move said another abutment member upon said driving element moving contiguous said first and second positions, and means yielding against the movement of said another abutment member thereby absorbing the momentum transferred thereto from said turret through said meshed gear means.

17. The mechanism as defined in claim 16 wherein said driven element includes cam cooperative with a cam follower defining said driving element, and said cam being defined by a central drive cam portion and a dwell cam portion on opposite sides of said central drive cam portions.

18. The mechanism as defined in claim 17 wherein said gear means includes a ring gear carried by said turret in mesh with a gear carried by said crankshaft.

19. The mechanism as defined in claim 17 wherein said gear means includes a ring gear carried by said turret in mesh with a gear carried by said crankshaft, and said another abutment member being carried by said ring gear.

20. The mechanism as defined in claim 17 wherein said gear means includes a first gear fixed to and carried by said crankshaft and a second gear carried by and rotatable relative to said turret, and said another abutment member being carried by said second gear.

21. The mechanism as defined in claim 16 wherein said gear means includes a ring gear carried by said turret in mesh with a gear carried by said crankshaft.

22. The mechanism as defined in claim 16 wherein said gear means includes a ring gear carried by said turret in mesh with a gear carried by said crankshaft, and said another abutment member being carried by said ring gear.

23. The mechanisms as defined in claim 16 wherein said gear means includes a first gear fixed to and carried by said crankshaft and a second gear carried by and rotatable relative to said turret, and said another abutment member being carried by said second gear.

24. A mechanims for translating rotational motion to linear motion comprising a turret, gear means for rotating said turret about a first axis, a crankshaft, means mounting said crankshaft for rotation relative to said turret about a second axis generally parallel to but offset from said first axis, a crank arm carried by said crankshaft and being disposed in transverse relationship to said second axis, a driven element, means for guiding the driven element for movement along a generally linear path, said crank arm having a driving element for driving said driven element upon rotation of said turret, said driving element including a cam and said driving element including a cam follower, said cam follower having a third axis generally parallel to but offset from said first and second axes, said cam follower being moved upon the rotation of said turret between first and second generally diametrically opposite positions relative to the arc of rotation of said turret, said first, second and third axes lying a common plane in the first and second positions of said driving element, said common plane being parallel to said linear path, means for absorbing the momentum of a load driven by said element when said driving element is contiguous said first and second positions, said momentum absorbing means including a pair of cooperative abutment members, one of said abutment members being carried by said turret for movement thereby generally between said first and second positions, gear means meshingly interconnecting another of said abutment members and said crankshaft, said one abutment member being effective to contact and move said another abutment member upon said driving element moving contiguous said first and second positions, means yielding against the movement of said another abutment member thereby absorbing the momentum transferred thereto from said turret through said meshed gear means, said cam being defined by a central drive cam portion and a dwell cam portion on opposite sides of said central drive cam portion, said one abutment member having a fourth axis generally parallel to but offset from said first, second and third axes, and said fourth axis lying in said common plane with said first, second and third axes in the first and second positions of said driving element.

25. The mechanism as defined in claim 24 wherein said gear means includes a ring gear carried by said turret in mesh with a gear carried by said crank shaft.

26. The mechanism as defined in claim 24 wherein said gear means includes a ring gear carried by said turret in mesh with a gear carried by said crankshaft, and said another abutment member being carried by said ring gear.

27. The mechanism as defined in claim 24 wherein said gear means includes a first gear fixed to and carried by said crankshaft and a second gear carried by and rotatable relative to said turret, and said another abutment member being carried by said second gear.

28. A mechanism for translating rotational motion to linear motion comprising a turret, means for rotating said turret about a first axis, a crankshaft, means mounting said crankshaft for rotation relative to said turret about a second axis generally parallel to but offset from said first axis, a crank arm carried by said crankshaft and being disposed in transverse relationship to said second axis, a driven element, means for guiding the driven element for movement along a generally linear path, said crank arm having a driving element for driving said driven element upon rotation of said turret, said driving element having a third axis generally parrallel to but offset from said first and second axes, said driving element being moved upon the rotation of said turret between first and second generally diametrically opposite positions relative to the arc of rotation of said turret, and said first, second and third axes lying in a common plane in the first and second positions of said driving element, means for absorbing the momentum of a load driven by said driven element when said driving element is contiguous said first and second positions, said momentum absorbing means including a pair of cooperative abutment members, one of said abutment members being carried by said turret for movement thereby generally between said first and second positions, gear means meshingly interconnecting another of said abutment members and said crankshaft, said one abutment member being effective to contact and move said another abutment member upon said driving element moving contiguous said first and second positions, means yielding against the movement of said another abutment member thereby absorbing the momentum transferred thereto from said turret through said meshed gear means, said one abutment member having a fourth axis generally parallel to but offset from said first, second and third axes, and said fourth axis lying in said common plane with said first, second and third axes in the first and second positions of said driving element.

29. The mechanism as defined in claim 28 wherein said common plane is parallel to said linear path.

30. The mechanism as defined in claim 29 wherein said driven element includes cam cooperative with a cam follower defining said driving element, and said cam being defined by a central drive cam portion and a dwell cam portion on opposite sides of said central drive cam portion.

31. The mechanism as defined in claim 28 wherein said driven element includes cam cooperative with a cam follower defining said driving element, and said cam being defined by a central drive cam portion and a dwell cam portion on opposite sides of said central drive cam portion.

* * * * *